United States Patent
Sankrithi

(10) Patent No.: US 10,710,734 B2
(45) Date of Patent: Jul. 14, 2020

(54) HYBRID AIRCRAFT PROPULSORS HAVING ELECTRICALLY-DRIVEN AUGMENTOR FANS

(71) Applicant: The Boeing Company, Chicago, IL (US)

(72) Inventor: Mithra M. K. V. Sankrithi, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 15/689,992

(22) Filed: Aug. 29, 2017

(65) Prior Publication Data

US 2019/0061963 A1   Feb. 28, 2019

(51) Int. Cl.
*B64D 27/00* (2006.01)
*B64D 27/24* (2006.01)
(Continued)

(52) U.S. Cl.
CPC ............. *B64D 27/24* (2013.01); *B64C 11/30* (2013.01); *B64D 27/16* (2013.01); *B64D 41/00* (2013.01); *F01D 15/10* (2013.01); *F02K 3/06* (2013.01); *F02K 3/072* (2013.01); *F02K 5/00* (2013.01); *H02K 7/1823* (2013.01); *B64D 2027/026* (2013.01); *F02K 1/66* (2013.01);
(Continued)

(58) Field of Classification Search
CPC ... B64C 11/30; B64C 2201/165; B64D 41/00; B64D 2027/026; B64D 2027/005; B64D 35/04; F01D 15/10; F02K 3/06; F02K 5/00; H02K 7/1823; F05D 2220/324; F05D 2220/325; F05D 2220/76; F05D 2220/60; F02C 7/32; F02C 7/36; F02C 6/14; B60K 6/28
See application file for complete search history.

(56) References Cited

U.S. PATENT DOCUMENTS

| 8,689,538 B2 | 4/2014 | Sankrithi et al. | |
| 2005/0029886 A1* | 2/2005 | Van Tichelen | H02K 21/24 310/156.32 |

(Continued)

OTHER PUBLICATIONS

Quantum Devices, Inc., Brushless Motors vs Brush Motors, What's the Difference?, Aug. 27, 2014 (Year: 2014).*

*Primary Examiner* — Todd E Manahan
*Assistant Examiner* — Edwin Kang
(74) *Attorney, Agent, or Firm* — Hanley, Flight & Zimmerman, LLC

(57) ABSTRACT

Hybrid aircraft propulsors having electrically-driven augmentor fans are disclosed. An example apparatus includes a turbofan having a core engine and a ducted fan to be rotated via the core engine. The ducted fan includes a plurality of ducted fan blades arranged circumferentially around the core engine and circumscribed by a nacelle. The example apparatus further includes an augmentor fan having an augmentor hub ring and a plurality of augmentor fan blades. The augmentor fan blades are arranged circumferentially around the augmentor hub ring and project outwardly relative to an outer surface of the nacelle. The augmentor fan is to rotate separately from the ducted fan. The example apparatus further includes an electrical drive to rotate the augmentor hub ring in response to a supply of electrical energy provided to the electrical drive.

22 Claims, 21 Drawing Sheets

(51) Int. Cl.
*B64D 41/00* (2006.01)
*F02K 3/06* (2006.01)
*F01D 15/10* (2006.01)
*H02K 7/18* (2006.01)
*B64C 11/30* (2006.01)
*B64D 27/16* (2006.01)
*F02K 5/00* (2006.01)
*F02K 3/072* (2006.01)
*B64D 27/02* (2006.01)
*F02K 1/66* (2006.01)

(52) U.S. Cl.
CPC .. *F05D 2220/323* (2013.01); *F05D 2220/324* (2013.01); *F05D 2220/325* (2013.01); *F05D 2220/327* (2013.01); *F05D 2220/76* (2013.01); *F05D 2260/42* (2013.01)

(56) References Cited

U.S. PATENT DOCUMENTS

| | | | |
|---|---|---|---|
| 2010/0329844 A1* | 12/2010 | Bradbrook | F02C 7/36 415/61 |
| 2011/0056183 A1* | 3/2011 | Sankrithi | B64C 11/48 60/204 |
| 2013/0076120 A1* | 3/2013 | Wagner | B64D 33/00 307/9.1 |
| 2014/0223884 A1 | 8/2014 | Sankrithi | |
| 2015/0013306 A1* | 1/2015 | Shelley | F02K 5/00 60/224 |
| 2017/0058781 A1* | 3/2017 | Waltner | F02C 7/36 |
| 2017/0114778 A1* | 4/2017 | Madson | F03D 13/25 |
| 2017/0122257 A1 | 5/2017 | Sankrithi | |
| 2017/0174337 A1* | 6/2017 | Roberts | B64C 27/14 |

\* cited by examiner

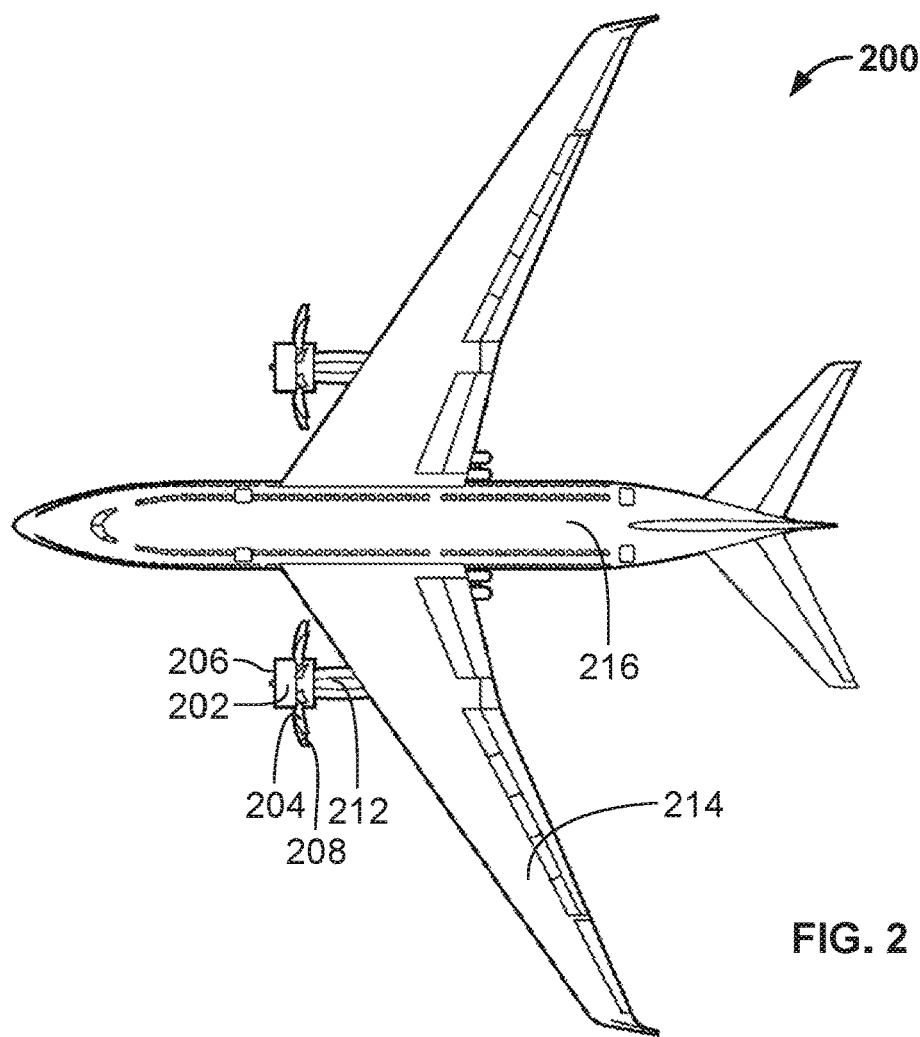
FIG. 2
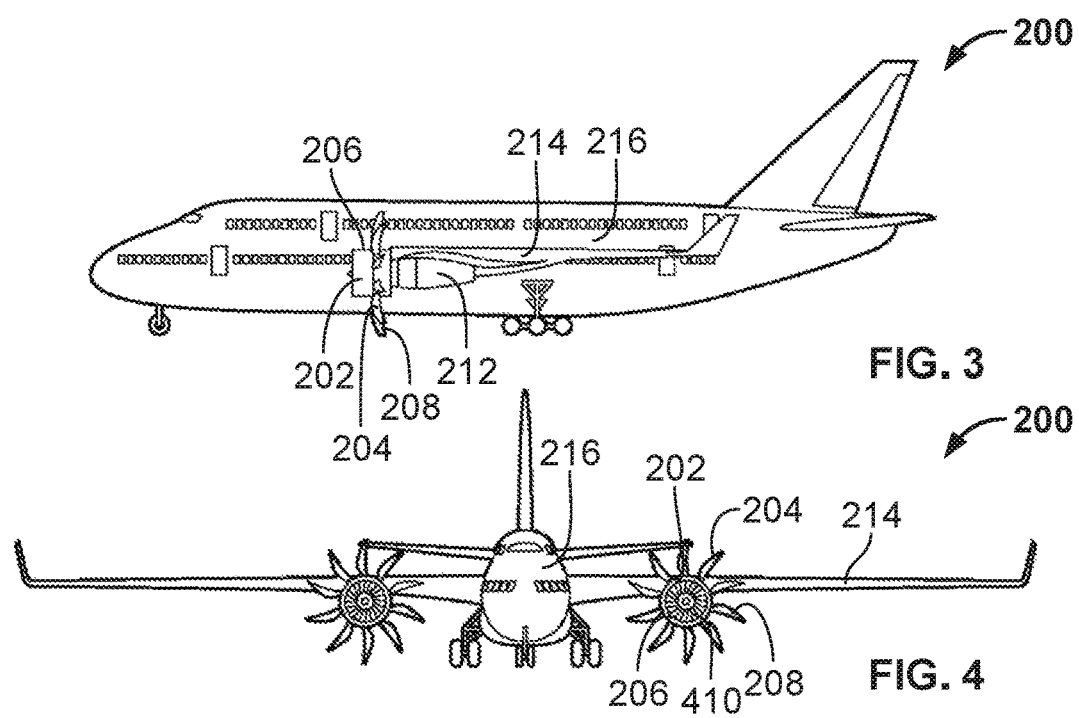
FIG. 3
FIG. 4

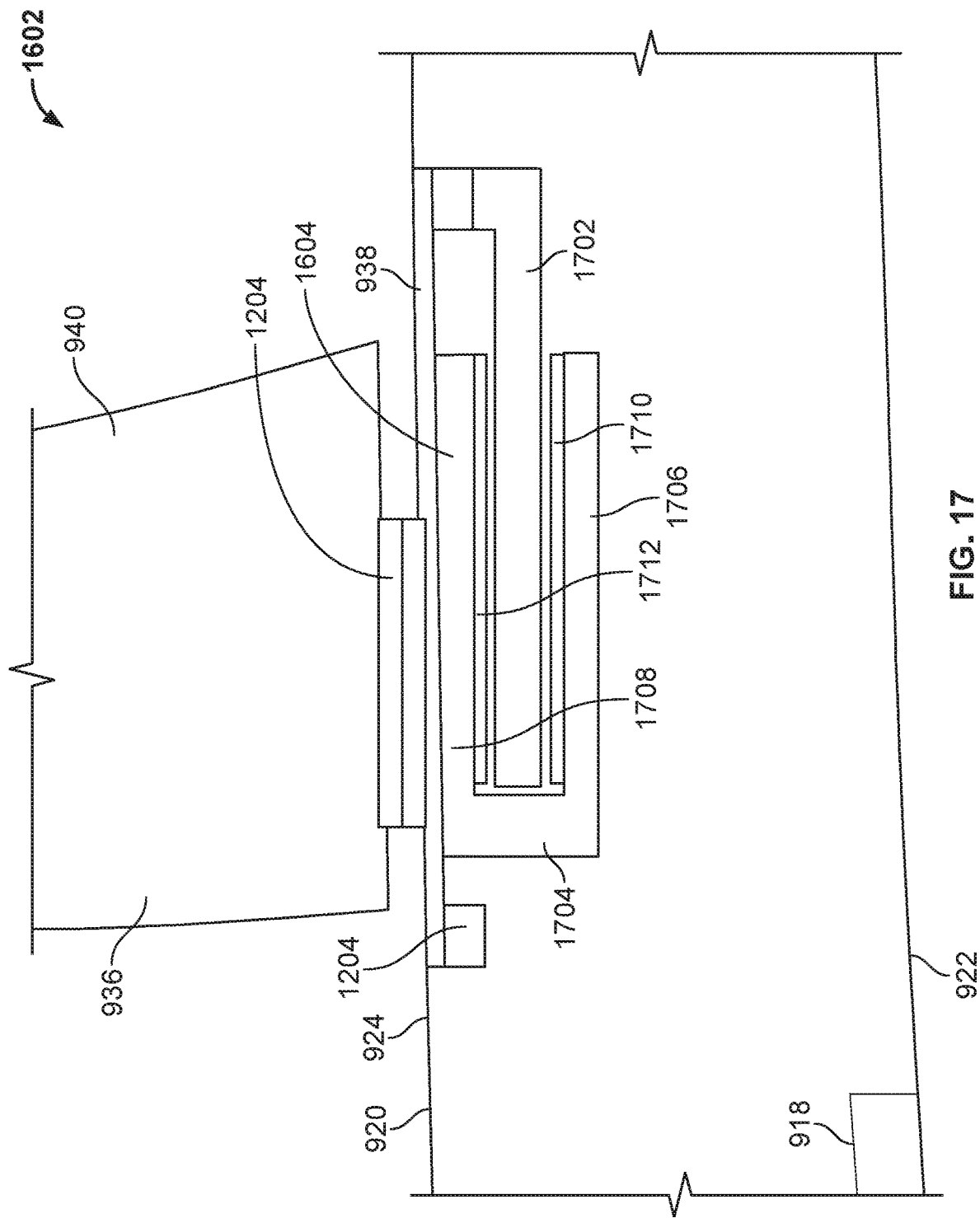

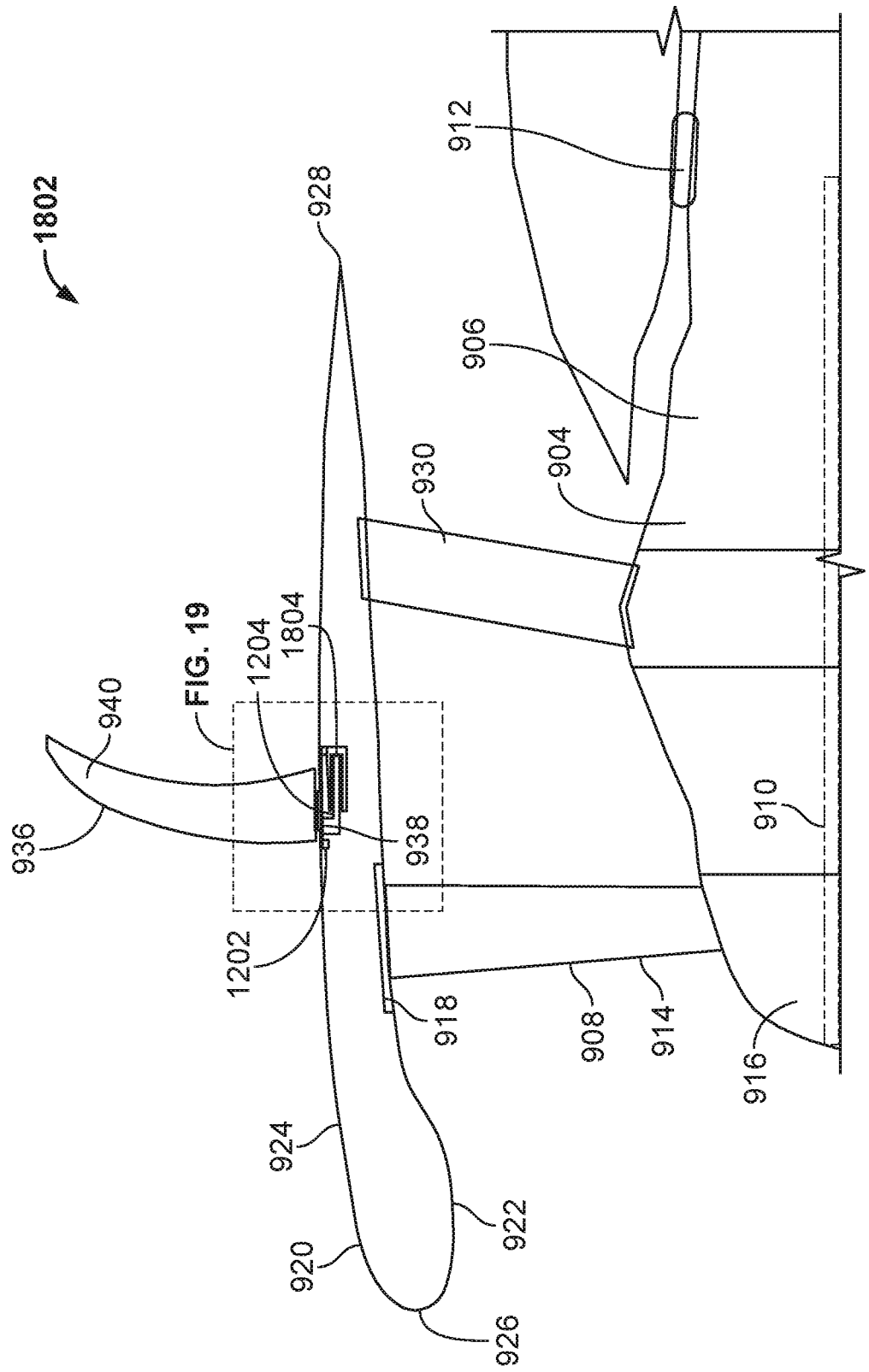

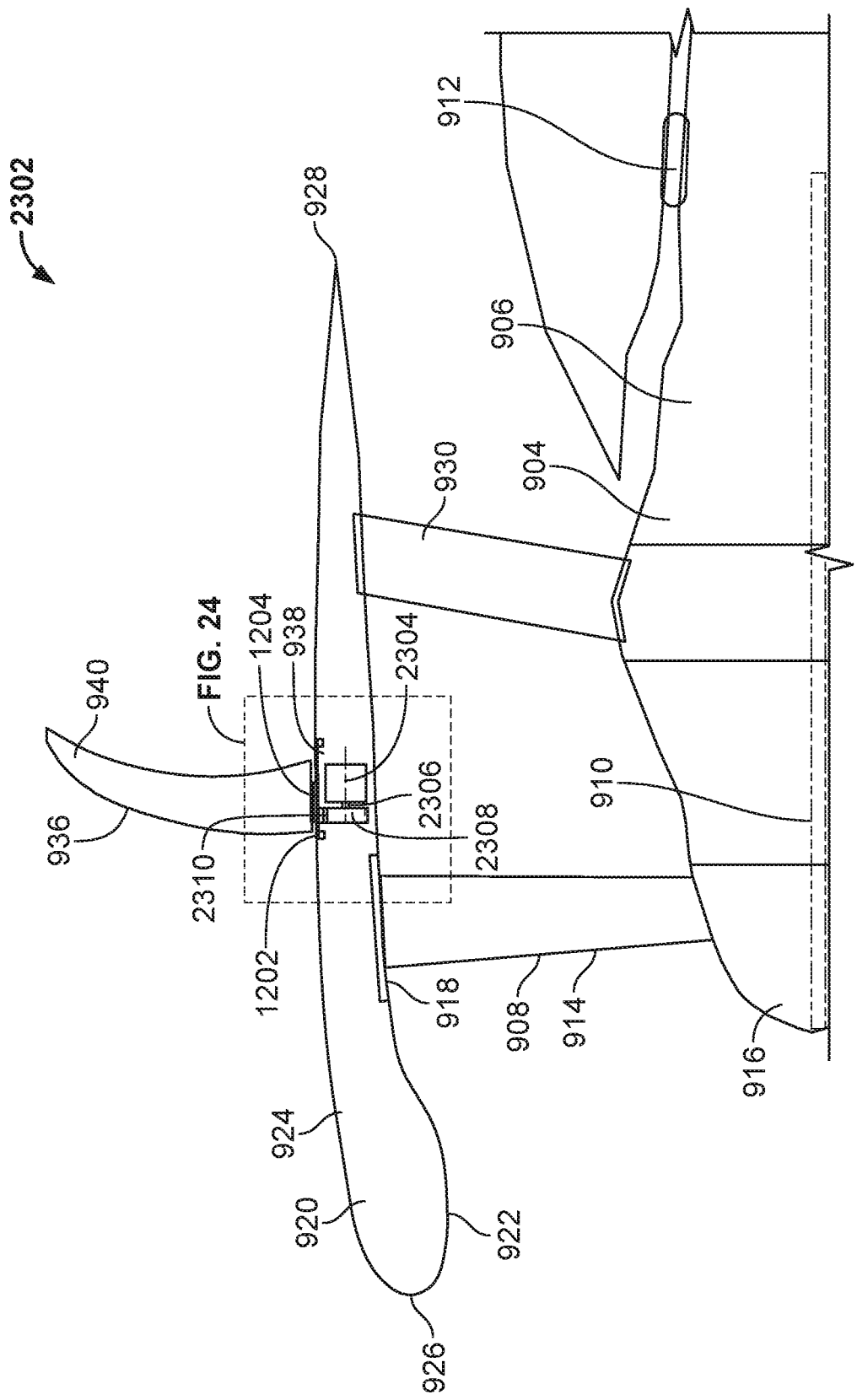

HYBRID AIRCRAFT PROPULSORS HAVING ELECTRICALLY-DRIVEN AUGMENTOR FANS

FIELD OF THE DISCLOSURE

This disclosure relates generally to aircraft propulsors having augmentor fans and, more particularly, to hybrid aircraft propulsors having electrically-driven augmentor fans.

BACKGROUND

Turbofan aircraft engines may be equipped with augmentor fans to increase a bypass ratio of the turbofan while maintaining the benefit of a reduction in noise attributable to the turbofan being shrouded (e.g., via a nacelle surrounding a ducted fan of the turbofan). Example aircraft propulsors having mechanically-driven augmentor fans are disclosed in U.S. Pat. No. 8,689,538, issued on Apr. 8, 2014, entitled "Ultra-Efficient Propulsor with an Augmentor Fan Circumscribing a Turbofan." Example aircraft propulsors having air-driven augmentor fans are disclosed in U.S. Patent Publication No. 2017/0122257, published on May 4, 2017, entitled "Nacelle-Integrated Air-Driven Augmentor Fan for Increasing Propulsor Bypass Ratio and Efficiency." U.S. Pat. No. 8,689,538 and U.S. Patent Publication No. 2017/0122257 are hereby incorporated by reference herein in their entireties.

SUMMARY

Hybrid aircraft propulsors having electrically-driven augmentor fans are disclosed. In some examples, an apparatus is disclosed. In some disclosed examples, the apparatus comprises a turbofan including a core engine and a ducted fan to be rotated via the core engine. In some disclosed examples, the ducted fan includes a plurality of ducted fan blades arranged circumferentially around the core engine and circumscribed by a nacelle. In some disclosed examples, the apparatus further comprises an augmentor fan including an augmentor hub ring and a plurality of augmentor fan blades. In some disclosed examples, the augmentor fan blades are arranged circumferentially around the augmentor hub ring and project outwardly relative to an outer surface of the nacelle. In some disclosed examples, the augmentor fan is to rotate separately from the ducted fan. In some disclosed examples, the apparatus further comprises an electrical drive to rotate the augmentor hub ring in response to a supply of electrical energy provided to the electrical drive.

In some examples, an apparatus is disclosed. In some disclosed examples, the apparatus comprises a turbofan including a core engine and a ducted fan to be rotated via the core engine. In some disclosed examples, the ducted fan includes a plurality of ducted fan blades arranged circumferentially around the core engine and circumscribed by a nacelle. In some disclosed examples, the apparatus further comprises an augmentor fan including an augmentor hub ring and a plurality of augmentor fan blades. In some disclosed examples, the augmentor fan blades are arranged circumferentially around the augmentor hub ring and project outwardly relative to an outer surface of the nacelle. In some disclosed examples, the augmentor fan is to rotate separately from the ducted fan. In some disclosed examples, the apparatus further comprises means for driving the augmentor hub ring to rotate in response to a supply of electrical energy provided to the means for driving.

In some examples, a method is disclosed. In some disclosed examples, the method comprises rotating a ducted fan of a turbofan via a core engine of the turbofan. In some disclosed examples, the ducted fan includes a plurality of ducted fan blades arranged circumferentially around the core engine and circumscribed by a nacelle. In some disclosed examples, the method further comprises rotating an augmentor fan via an electrical drive in response to a supply of electrical energy provided to the electrical drive. In some disclosed examples, the augmentor fan includes an augmentor hub ring and a plurality of augmentor fan blades. In some disclosed examples, the augmentor fan blades are arranged circumferentially around the augmentor hub ring and project outwardly relative to an outer surface of the nacelle. In some disclosed examples, the rotating of the augmentor fan is separate from the rotating of the ducted fan.

BRIEF DESCRIPTION OF THE DRAWINGS

FIG. 2 is a plan view of a second example aircraft in which a hybrid propulsor having an electrically-driven augmentor fan may be implemented in accordance with the teachings of this disclosure.

FIG. 3 is a side view of the second example aircraft of FIG. 2.

FIG. 4 is a front view of the second example aircraft of FIGS. 2 and 3.

FIG. 18 is a side cross-sectional view of a third example hybrid propulsor including a second example brushless ring motor.

FIG. 23 is a side cross-sectional view of a fourth example hybrid propulsor including a first example axial flux synchronous permanent magnet motor.

Figure 1:
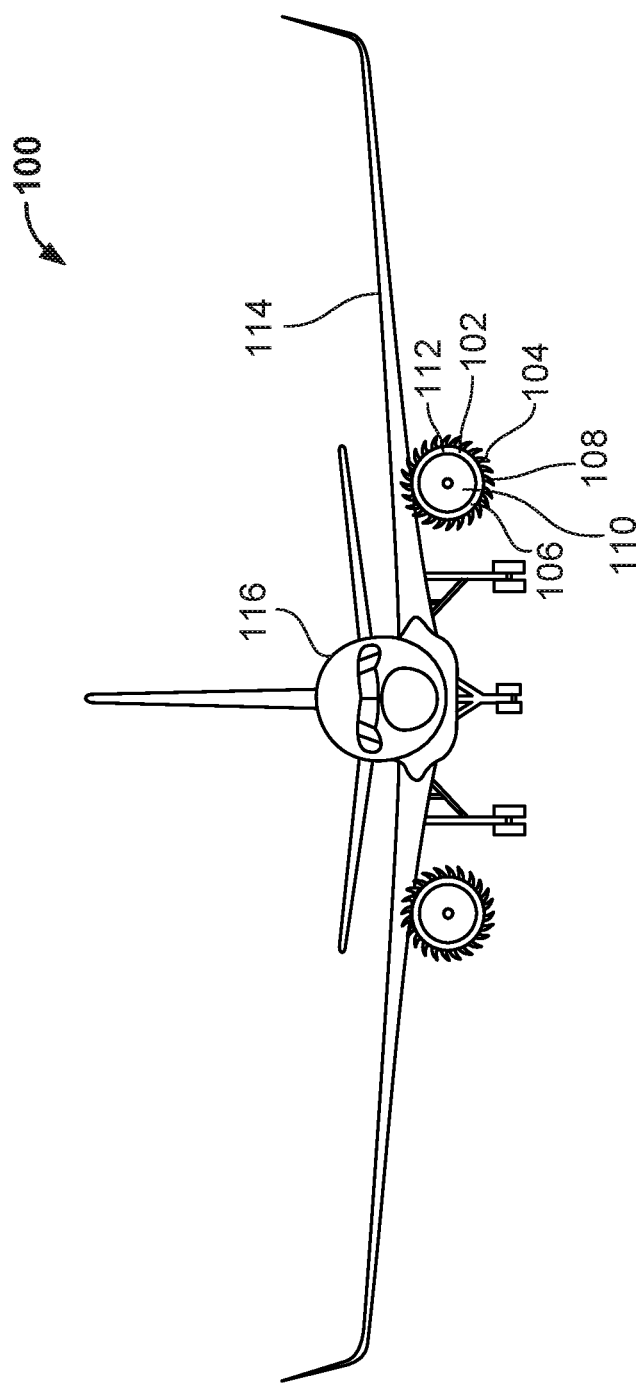
FIG. 1 illustrates a first example aircraft in which a hybrid propulsor having an electrically-driven augmentor fan may be implemented in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Turbofan aircraft engines equipped with augmentor fans provide several advantages relative to conventional turbofan engines. For example, incorporating an augmentor fan into a conventional turbofan engine increases a bypass ratio and reduces a fan pressure ratio of the turbofan engine while maintaining the benefit of a reduction in noise attributable to the turbofan engine being shrouded (e.g., via a nacelle surrounding a ducted fan of the turbofan engine). The increased bypass ratio and reduced fan pressure ratio attributable to the augmentor fan advantageously improves the fuel efficiency and reduces the operating costs associated with the modified turbofan engine relative to the fuel efficiency and operating costs associated with the conventional turbofan engine. Such advantages may be provided, for example, by the aircraft propulsors having mechanically-driven and/or air-driven augmentor fans disclosed in U.S. Pat. No. 8,689,538 and U.S. Patent Publication No. 2017/0122257, as referenced above.

Unlike the aircraft propulsors having mechanically-driven and/or air-driven augmentor fans as described in U.S. Pat. No. 8,689,538 and U.S. Patent Publication No. 2017/0122257, the hybrid aircraft propulsors disclosed herein include electrically-driven augmentor fans. As a result of being powered by electrical energy as opposed to jet fuel, the disclosed electrically-driven augmentor fans advantageously provide even further increases in fuel efficiency and reductions in operating costs relative to the above-referenced mechanically-drive and/or air-driven augmentor fans. The disclosed hybrid propulsors and/or electrically-driven augmentor fans also advantageously provide environmental benefits such as reduced carbon emissions.

The hybrid propulsors and/or electrically-driven augmentor fans disclosed herein advantageously leverage electrical energy produced and/or stored by conventional electrical energy sources of an aircraft. For example, the disclosed electrically-driven augmentor fans may receive a supply of electrical energy generated by an electrical generator of an auxiliary power unit and/or by an electrical generator of a gas turbine of an aircraft implementing the disclosed hybrid propulsors. The disclosed electrically-driven augmentor fans may additionally or alternatively receive a supply of electrical energy from one or more electrical energy storage device(s) of the aircraft, including, for example, a battery, a flywheel, and/or a supercapacitor.

As a result of being powered by an electrical energy source as opposed to being powered through a mechanical drive train, an electrically-driven augmentor fan of the disclosed hybrid propulsors is separately and/or independently rotatable relative to a mechanically-driven ducted fan of a turbofan of the disclosed hybrid propulsors. In some examples, the electrically-driven augmentor fan may advantageously remain operable in instances in which the mechanically-driven ducted fan stalls and/or fails. In some examples, some fan thrust associated with the electrically-driven augmentor fan may remain available following failure of a turbofan engine. The remaining available fan thrust may provide substantial benefits for an aircraft, and particularly for a twin-engine aircraft. For example, the remaining available fan thrust may advantageously provide additional total available thrust and reduced engine-failure yawing moment following a failure of a turbofan engine, thereby providing synergistic benefits in aircraft thrust sizing, vertical fin and rudder sizing, aircraft weight, and aircraft fuel efficiency. In some examples, the electrically-driven augmentor fan may be rotated at a different time and/or in a different direction relative to the time and/or direction at which the mechanically-driven ducted fan is rotated. In some such examples, the electrically-driven augmentor fan may function and/or operate as a thrust reverser having an associated direction of thrust that is opposite a direction of thrust provided by the mechanically-driven ducted fan in normal forward flight operations.

FIG. 1 illustrates a first example aircraft 100 in which an example hybrid propulsor 102 having an example electrically-driven augmentor fan 104 may be implemented in accordance with the teachings of this disclosure. The augmentor fan 104 of FIG. 1 is integrated into an example nacelle 106 of FIG. 1 such that example augmentor fan blades 108 of the augmentor fan 104 project outwardly from the nacelle 106. The nacelle 106 circumscribes an example ducted fan 110 of an example turbofan 112 of FIG. 1. In the illustrated example of FIG. 1, the turbofan 112 is coupled to an example wing 114 of the aircraft 100, and the wing 114 is coupled to an example fuselage 116 of the aircraft 100 at a lower portion thereof. The augmentor fan 104 is positioned forward of the wing 114 of the aircraft 100. The augmentor fan 104 of FIG. 1 and the ducted fan 110 of FIG. 1 are separately and/or independently rotatable. In some examples, the augmentor fan 104 is electrically driven (e.g., via an electrical drive incorporated into the nacelle 106 of FIG. 1) and the ducted fan 110 is mechanically driven (e.g., via the turbofan 112 of FIG. 1), thereby providing for an aircraft propulsor that is hybrid in nature.

FIG. 2 is a plan view of a second example aircraft 200 in which an example hybrid propulsor 202 having an example electrically-driven augmentor fan 204 may be implemented in accordance with the teachings of this disclosure. FIG. 3 is a side view of the second example aircraft 200 of FIG. 2. FIG. 4 is a front view of the second example aircraft 200 of FIGS. 2 and 3. The augmentor fan 204 of FIGS. 2-4 is integrated into an example nacelle 206 of FIGS. 2-4 such that example augmentor fan blades 208 of the augmentor fan 204 project outwardly from the nacelle 206. The nacelle 206 circumscribes an example ducted fan 410 of an example turbofan 212 of FIGS. 2-4. In the illustrated example of FIGS. 2-4, the turbofan 212 is coupled to an example wing 214 of the aircraft 200, and the wing 214 is coupled to an example fuselage 216 of the aircraft 200 at a middle portion thereof. The augmentor fan 204 is positioned forward of the wing 214 of the aircraft 200. The augmentor fan 204 of FIGS. 2-4 and the ducted fan 410 of FIGS. 2-4 are separately and/or independently rotatable. In some examples, the augmentor fan 204 is electrically driven (e.g., via an electrical drive incorporated into the nacelle 206 of FIGS. 2-4) and the ducted fan 410 is mechanically driven (e.g., via the turbofan 212 of FIGS. 2-4), thereby providing for an aircraft propulsor that is hybrid in nature.

Figure 5:
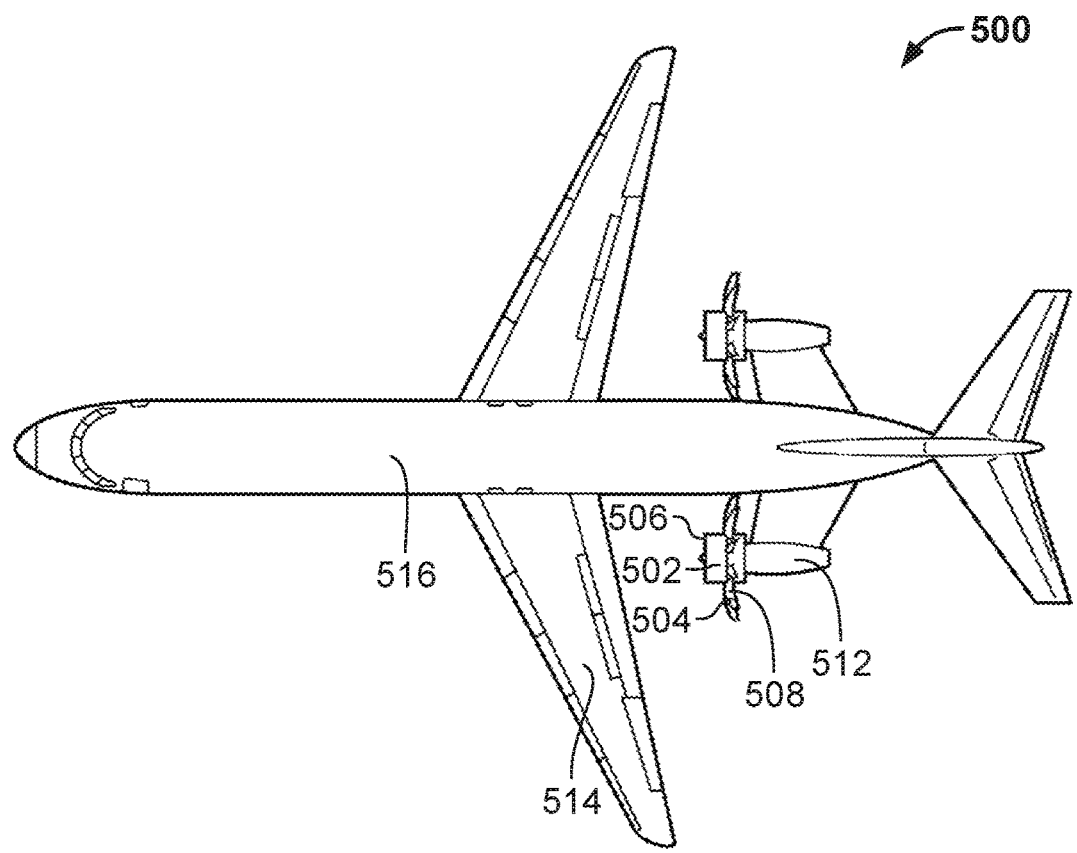
FIG. 5 is a plan view of a third example aircraft in which a hybrid propulsor having an electrically-driven augmentor fan may be implemented in accordance with the teachings of this disclosure.
Figure 6:
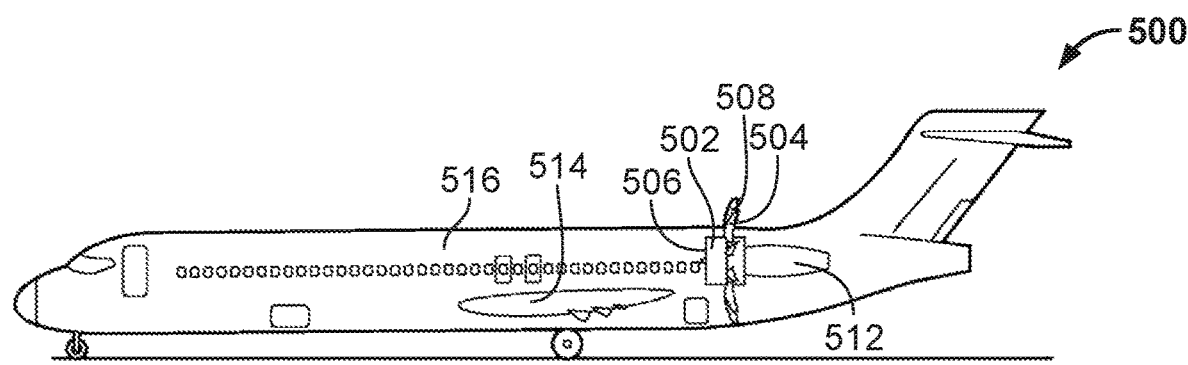
FIG. 6 is a side view of the third example aircraft of FIG. 5.
Figure 7:
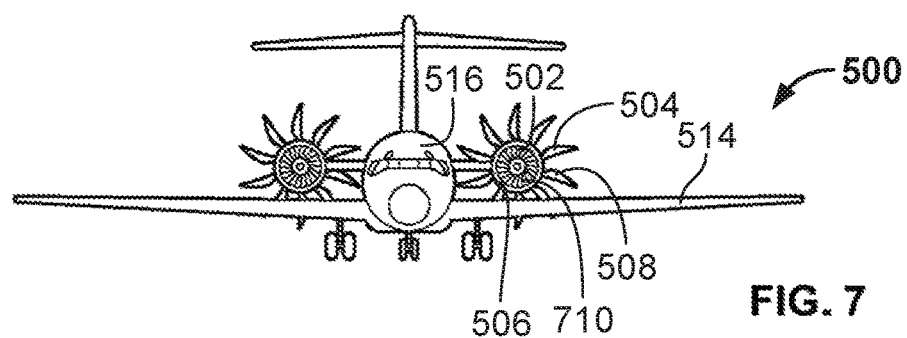
FIG. 7 is a front view of the third example aircraft of FIGS. 5 and 6.

FIG. 5 is a plan view of a third example aircraft 500 in which an example hybrid propulsor 502 having an example electrically-driven augmentor fan 504 may be implemented in accordance with the teachings of this disclosure. FIG. 6 is a side view of the third example aircraft 500 of FIG. 5. FIG. 7 is a front view of the third example aircraft 500 of FIGS. 5 and 6. The augmentor fan 504 of FIGS. 5-7 is integrated into an example nacelle 506 of FIGS. 5-7 such that example augmentor fan blades 508 of the augmentor fan 504 project outwardly from the nacelle 506. The nacelle 506 circumscribes an example ducted fan 710 of an example turbofan 512 of FIGS. 5-7. In the illustrated example of FIGS. 5-7, the turbofan 512 is coupled to an example fuselage 516 of the aircraft at an area located aft and/or rearward of an example wing 514 of the aircraft 500. The augmentor fan 504 is also positioned aft and/or rearward of the wing 514 of the aircraft 500. The augmentor fan 504 of FIGS. 5-7 and the ducted fan 710 of FIGS. 5-7 are separately and/or independently rotatable. In some examples, the augmentor fan 504 is electrically driven (e.g., via an electrical drive incorporated into the nacelle 506 of FIGS. 5-7) and the ducted fan 710 is mechanically driven (e.g., via the turbofan 512 of FIGS. 5-7), thereby providing for an aircraft propulsor that is hybrid in nature.

Figure 8:
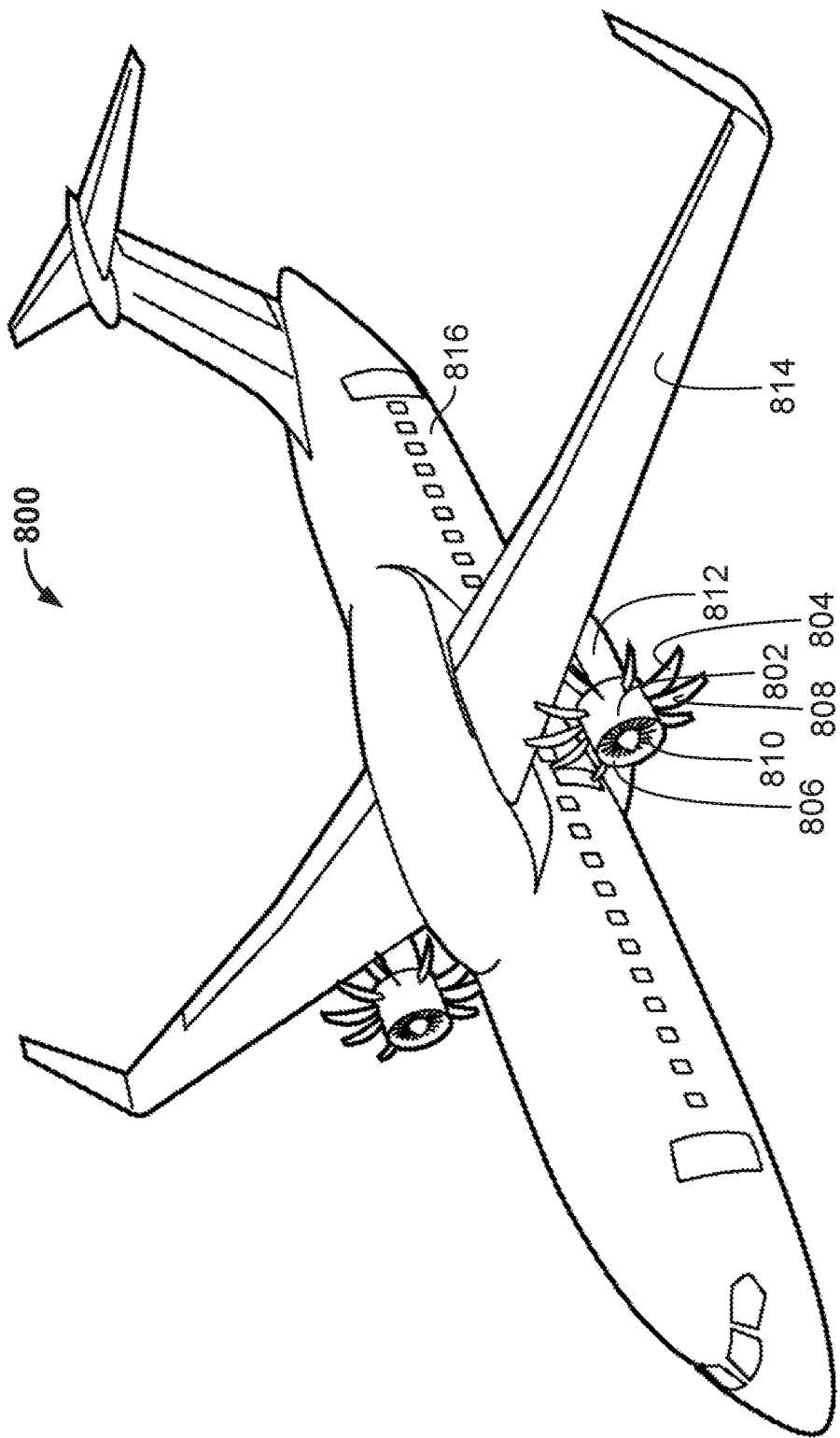
FIG. 8 illustrates a fourth example aircraft in which a hybrid propulsor having an electrically-driven augmentor fan may be implemented in accordance with the teachings of this disclosure.

FIG. 8 illustrates a fourth example aircraft 800 in which an example hybrid propulsor 802 having an example electrically-driven augmentor fan 804 may be implemented in accordance with the teachings of this disclosure. The augmentor fan 804 of FIG. 8 is integrated into an example nacelle 806 of FIG. 8 such that example augmentor fan blades 808 of the augmentor fan 804 project outwardly from the nacelle 806. The nacelle 806 circumscribes an example ducted fan 810 of an example turbofan 812 of FIG. 8. In the illustrated example of FIG. 8, the turbofan 812 is coupled to an example wing 814 of the aircraft 800, and the wing 814 is coupled to an example fuselage 816 of the aircraft 100 at an upper portion thereof. The augmentor fan 804 is positioned forward of the wing 814 of the aircraft 800. The augmentor fan 804 of FIG. 8 and the ducted fan 810 of FIG. 8 are separately and/or independently rotatable. In some examples, the augmentor fan 804 is electrically driven (e.g., via an electrical drive incorporated into the nacelle 806 of FIG. 8) and the ducted fan 810 is mechanically driven (e.g., via the turbofan 812 of FIG. 8), thereby providing for an aircraft propulsor that is hybrid in nature.

The illustrated examples of FIGS. 1-8 provide several example aircraft configurations for implementing hybrid propulsors having electrically-driven augmentor fans. Additional example aircraft configurations including propulsors having mechanically-driven and/or air-driven augmentor fans that may be modified according to the teachings of this disclosure to include hybrid propulsors having electrically-driven augmentor fans are provided in U.S. Pat. No. 8,689,538 and U.S. Patent Publication No. 2017/0122257, as referenced above. Additional details of example hybrid propulsors having example electrically-driven augmentor fans that may be implemented in connection with such example aircraft configurations are provided herein in connection with FIGS. 9-27.

In some examples, a hybrid propulsor having an electrically-driven augmentor fan as disclosed herein may be coupled to a wing of an aircraft. In some examples, a hybrid propulsor having an electrically-driven augmentor fan as disclosed herein may be coupled to a fuselage of an aircraft. In some examples, a hybrid propulsor having an electrically-driven augmentor fan as disclosed herein may be coupled to a tail of an aircraft. In some examples, a hybrid propulsor having an electrically-driven augmentor fan as disclosed herein may be coupled to an aircraft such that the augmentor fan is positioned forward of a wing of the aircraft. In some examples, a hybrid propulsor having an electrically-driven augmentor fan as disclosed herein may be coupled to an aircraft such that the augmentor fan is positioned rearward of a wing of the aircraft.

In some examples, a hybrid propulsor having an electrically-driven augmentor fan as disclosed herein may be integrated within a nacelle of an aircraft such that the augmentor fan is positioned between a leading edge and a trailing edge of the nacelle. In some examples, a hybrid propulsor having an electrically-driven augmentor fan as disclosed herein may be integrated within a nacelle of an aircraft such that the augmentor fan is positioned at and/or proximate a leading edge of the nacelle. In some examples, a hybrid propulsor having an electrically-driven augmentor fan as disclosed herein may be integrated within a nacelle of an aircraft such that the augmentor fan is positioned at and/or proximate a trailing edge of the nacelle.

Figure 9:
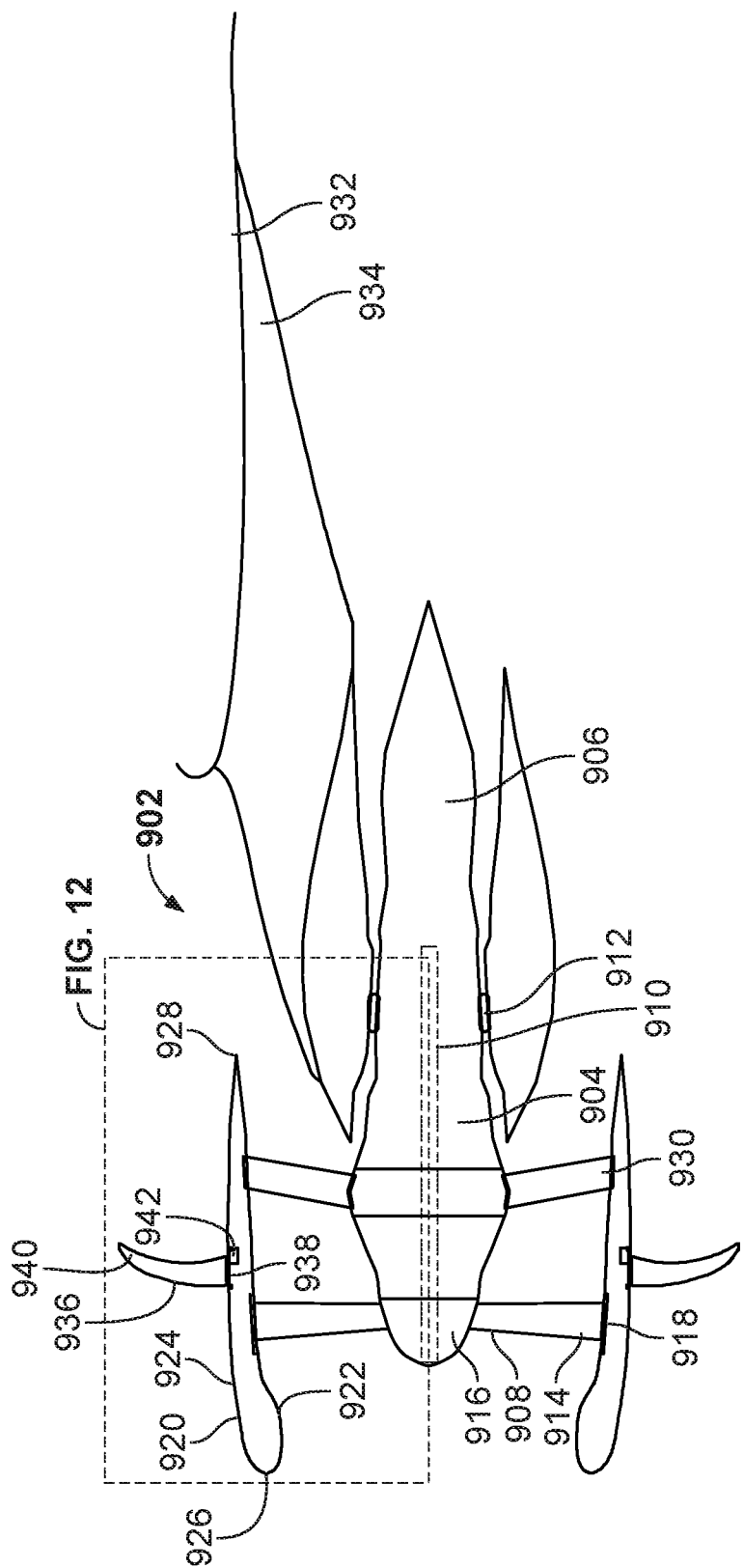
FIG. 9 is a side cross-sectional view of a first example hybrid propulsor having an example electrically-driven augmentor fan constructed in accordance with the teachings of this disclosure.
Figure 10:
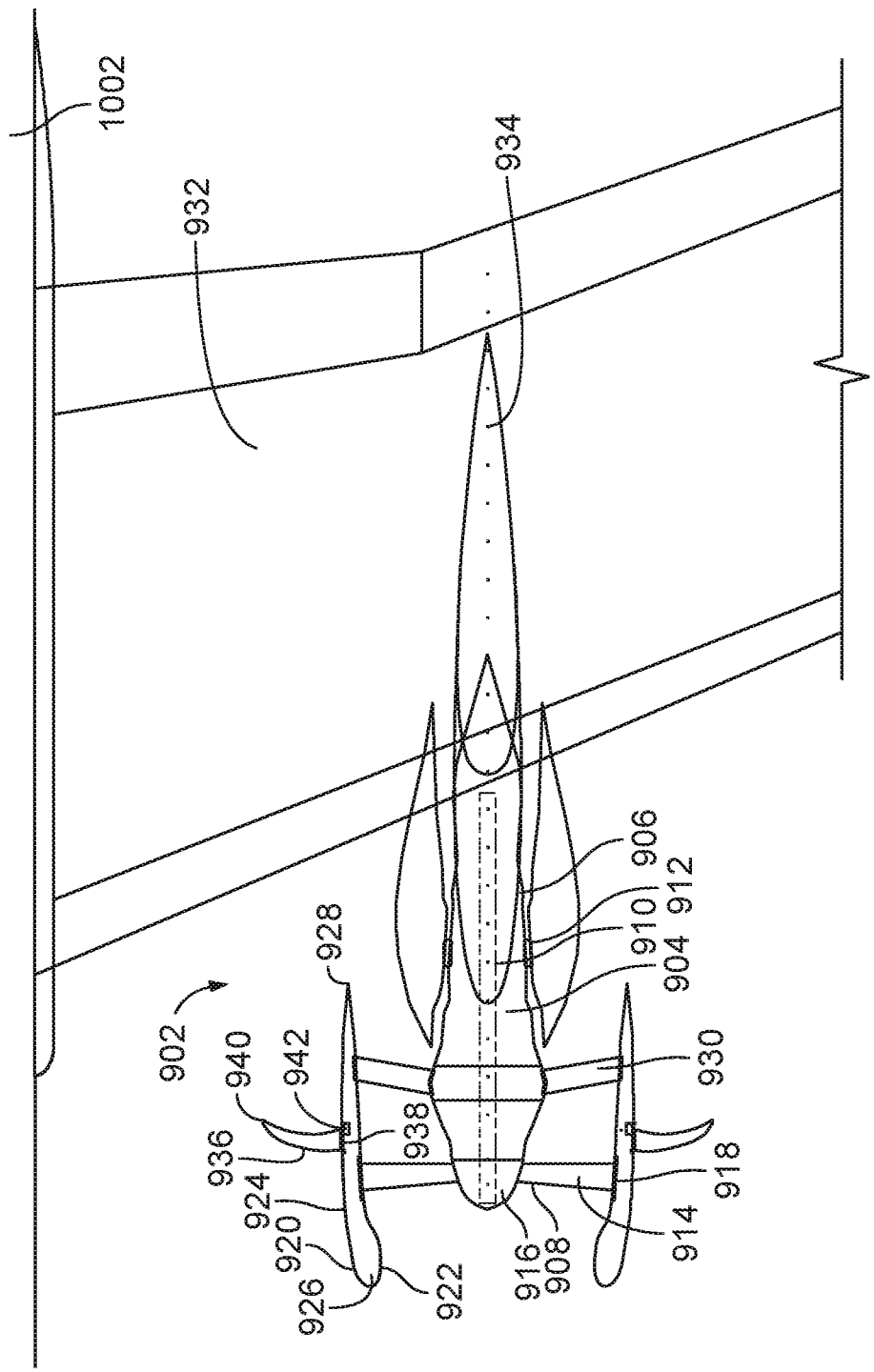
FIG. 10 is a plan cross-sectional view of the first example hybrid propulsor of FIG. 9.
Figure 11:
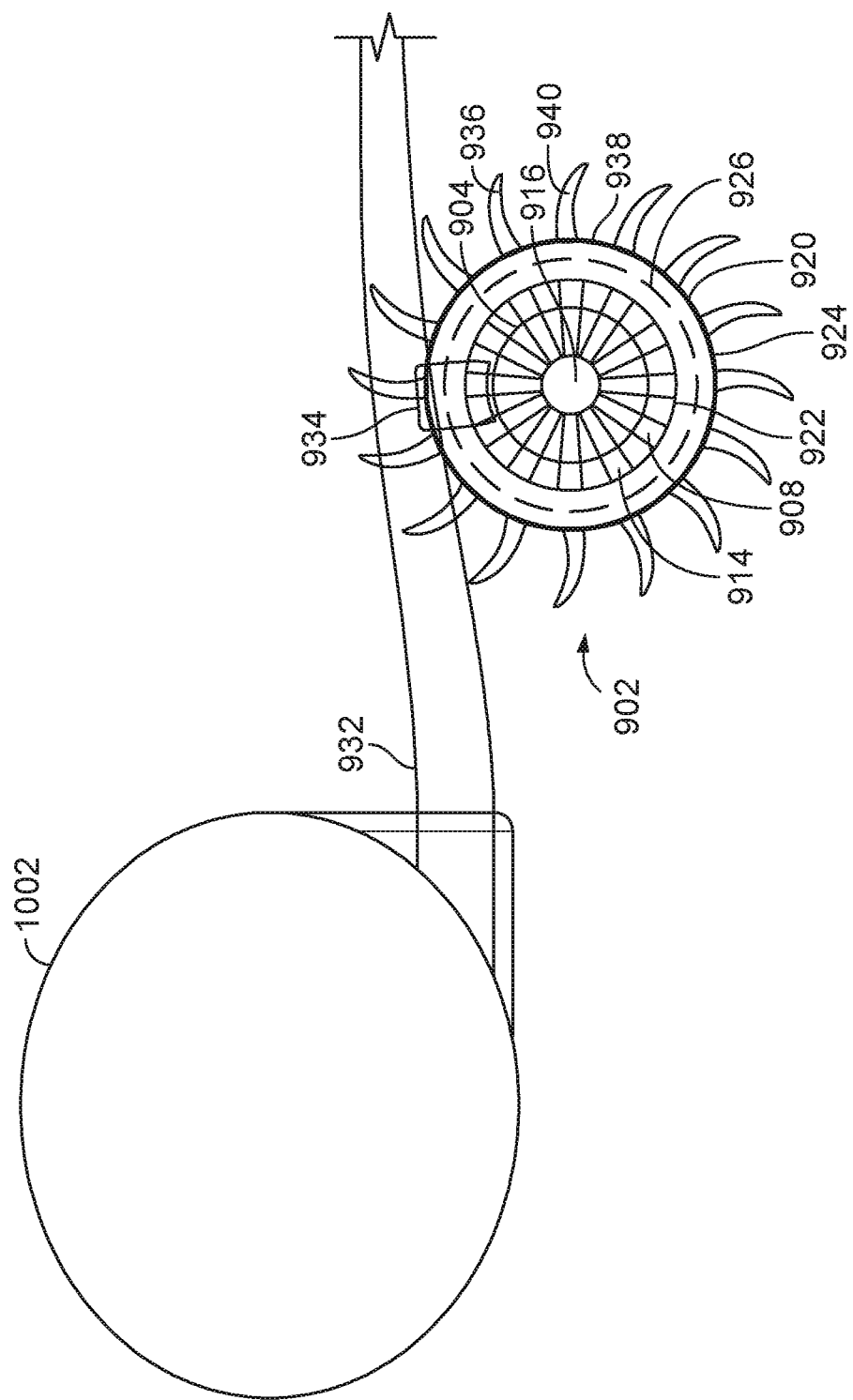
FIG. 11 is a front cross-sectional view of the first example hybrid propulsor of FIGS. 9 and 10.
Figure 12:
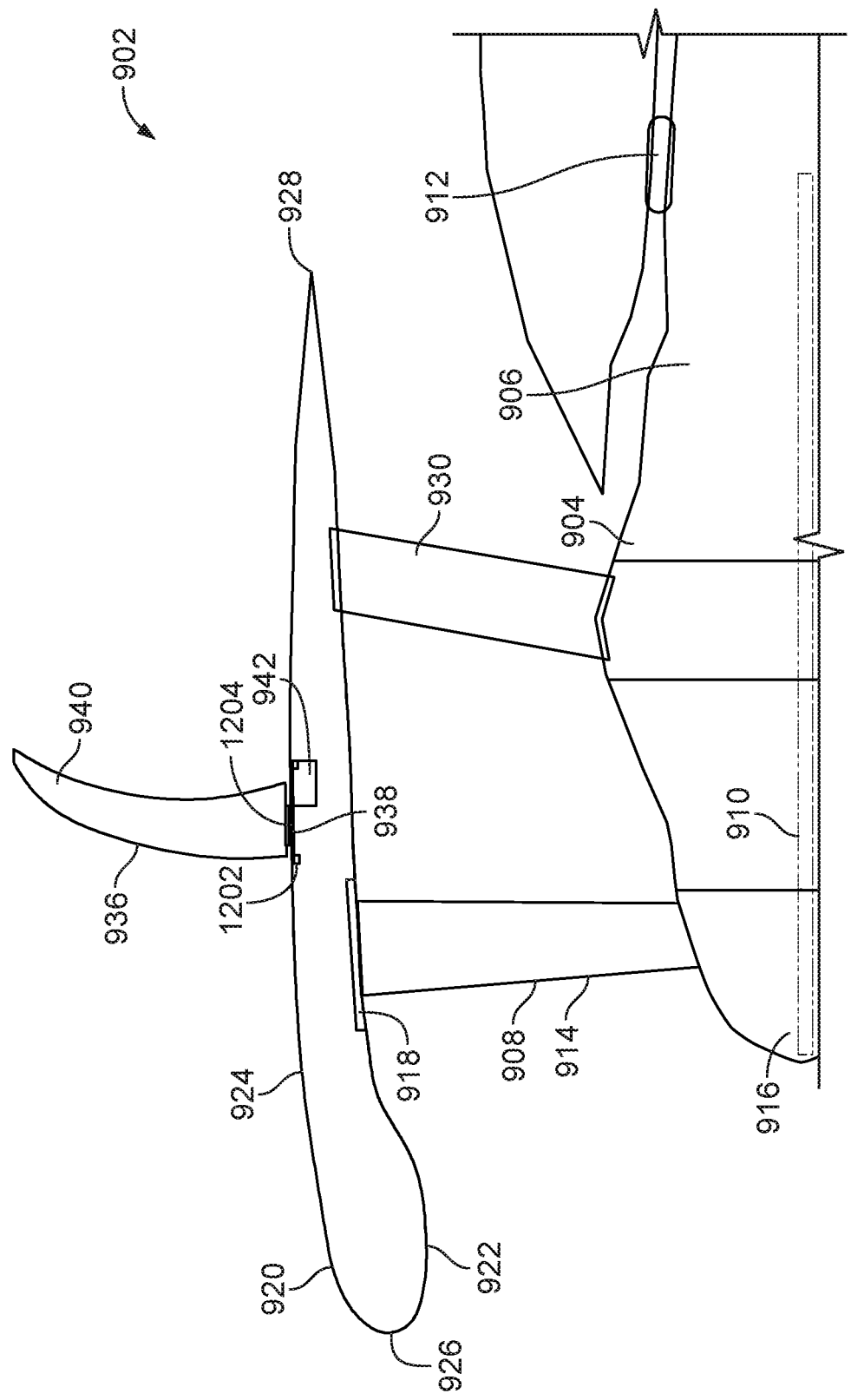
FIG. 12 is an enlarged view of a portion of FIG. 9.

FIG. 9 is a side cross-sectional view of a first example hybrid propulsor 902 having an example electrically-driven augmentor fan constructed in accordance with the teachings of this disclosure. FIG. 10 is a plan cross-sectional view of the first example hybrid propulsor 902 of FIG. 9. FIG. 11 is a front cross-sectional view of the first example hybrid propulsor 902 of FIGS. 9 and 10. FIG. 12 is an enlarged view of a portion of FIG. 9.

The hybrid propulsor 902 of FIGS. 9-12 includes an example turbofan 904 having an example core engine 906 and an example ducted fan 908 to be rotated via the core engine 906. In some examples, the ducted fan 908 is rotated in response to a combustion process occurring within the core engine 906. For example, the ducted fan 908 of FIGS. 9-12 may be driven (e.g., mechanically driven) to rotate via an example engine shaft 910 of the core engine 906 of FIGS. 9-12 that rotates in response to a combustion process occurring within an example combustion chamber 912 of the core engine 906, typically using a turbine driven by effluent from the combustion process. As is known from the prior art of gas turbine engines, the combustion chamber 912 is typically located downstream of at least one compressor (not shown) and upstream of at least one turbine (not shown).

The ducted fan 908 of FIGS. 9-12 includes example ducted fan blades 914 arranged circumferentially around the core engine 906 of FIGS. 9-12. In the illustrated example of FIGS. 9-12, the ducted fan blades 914 project outwardly from an example spinner 916 coupled to the core engine 906. The ducted fan blades 914 and/or, more generally, the ducted fan 908, is/are circumscribed by an example fan cowl 918, and the fan cowl 918 is circumscribed by an example nacelle 920. Thus, the ducted fan blades 914 and/or, more generally, the ducted fan 908 is/are circumscribed by the nacelle 920 of FIGS. 9-12. The nacelle 920 includes an example inner surface 922, an example outer surface 924 located opposite the inner surface 922, an example leading edge 926, and an example trailing edge 928 located opposite the leading edge 926.

In the illustrated example of FIGS. 9-12, the core engine 906 of the turbofan 904 is coupled to the nacelle 920 via example duct support struts 930. The core engine 906 of the turbofan 904 is also coupled to an example wing 932 of an aircraft via an example propulsor support 934. As shown in FIGS. 10 and 11, the wing 932 of FIGS. 9-12 is coupled to an example fuselage 1002 of the aircraft.

The hybrid propulsor 902 of FIGS. 9-12 also includes an example an augmentor fan 936 having an example augmentor hub ring 938 and example augmentor fan blades 940. The augmentor fan blades 940 are arranged circumferentially around the augmentor hub ring 938 and project outwardly relative to the outer surface 924 of the nacelle 920 of FIGS. 9-12. In the illustrated example of FIGS. 9-12, the augmentor hub ring 938 circumscribes the inner surface 922 of the nacelle 920 and is located proximate the outer surface 924 of the nacelle 920. In some examples, an outer surface of the augmentor hub ring 938 of FIGS. 9-12 is aligned with (e.g., is flush with) the outer surface 924 of the nacelle 920 of FIGS. 9-12. As shown in FIG. 12, the augmentor hub ring 938 of FIGS. 9-12 is rotatably coupled to the nacelle 920 of FIGS. 9-12 via example stewing ring bearings 1202 located within the nacelle 920 proximate the outer surface 924 of the nacelle 920.

In the illustrated example of FIGS. 9-12, the augmentor hub ring 938 of the augmentor fan 936 is electrically driven by one or more example electrical drive(s) 942 located within the nacelle 920. In some examples, a plurality of electrical drives 942 may be located within the nacelle 920 (e.g., between the inner surface 922 and the outer surface 924 of the nacelle 920) and arranged circumferentially around the inner surface 922 of the nacelle 920. As described in greater detail below in connection with FIGS. 14-26, respective ones of the electrical drive(s) 942 of FIGS. 9-12 may include one or more electric motor(s) such as, for example, a brushless ring motor or an axial flux synchronous permanent magnet motor.

In the illustrated example of FIGS. 9-12, the electrical drive(s) 942 of FIGS. 9-12 rotate the augmentor hub ring 938 of the augmentor fan 936 in response to a supply of electrical energy provided to the electrical drive(s) 942 from one or more electrical energy source(s) (not shown in FIGS. 9-12) located within and/or coupled to the aircraft. As described in greater detail below in connection with FIG. 13, the electrical energy to be provided to the electrical drive(s) 942 of FIGS. 9-12 may be generated and/or supplied via an electrical generator of an auxiliary power unit of the aircraft, or via an electrical generator of a gas turbine of the aircraft. The electrical energy may additionally or alternatively be supplied via one or more electrical energy storage device(s) of the aircraft such as, for example, one or more batter(ies), flywheel(s), or supercapacitor(s). Energy to be supplied to the electrical drive(s) 942 of FIGS. 9-12 via one or more of the aforementioned electrical energy source(s) may be supplied via one or more wire(s) and/or electrical conduit(s) operatively coupling the electrical energy source(s) to the electrical drive(s) 942. In some examples, such wire(s) and/or electrical conduit(s) may be routed from the electrical energy source(s) to the electrical drive(s) 942 of FIGS. 9-12 through one or more of the nacelle 920, the duct support struts 930, the core engine 906, the propulsor support 934, the wing 932, and/or the fuselage 1002 of FIGS. 9-12.

As shown in FIG. 12, the hybrid propulsor 902 of FIGS. 9-12 includes an example pitch control mechanism 1204 to control the pitch angle (e.g., the blade angle) of respective ones of the augmentor fan blades 940 coupled to the augmentor hub ring 938. Example mechanically-driven pitch control mechanism(s) that may be utilized to implement the pitch control mechanism 1204 of FIG. 12 are provided in U.S. Pat. No. 8,689,538 and U.S. Patent Publication No. 2017/0122257, as referenced above. Electrically-driven pitch control mechanism(s) including one or more electrical drive(s) and/or electric motor(s) may also be utilized to implement the pitch control mechanism 1204 of FIG. 12.

In some examples, the pitch control mechanism 1204 of FIG. 12 may adjust the positions of respective ones of the augmentor fan blades 940 of FIGS. 9-12 from a fine position to a feather position (and vice-versa), and/or to any position therebetween. In some examples, the pitch control mechanism 1204 of FIG. 12 may vary the positions of respective ones of the augmentor fan blades 940 of FIGS. 9-12 during flight and/or ground operations to provide desirable blade angles of attack that are optimized with respect to a measure of one or more of aerodynamic efficiency, fuel efficiency, community noise, cabin noise, emissions, takeoff performance, climb performance, cruise performance, descent performance, and/or reverse thrust performance associated with the hybrid propulsor 902 of FIGS. 9-12 and/or the aircraft to which the hybrid propulsor is coupled. The pitch control mechanism 1204 of FIG. 12 may also vary the positions of respective ones of the augmentor fan blades 940 of FIGS. 9-12 during flight to provide desirable blade angles of attack that are optimized with respect to a division of power between the ducted fan 908 and the augmentor fan 936 of FIGS. 9-12.

Figure 13:
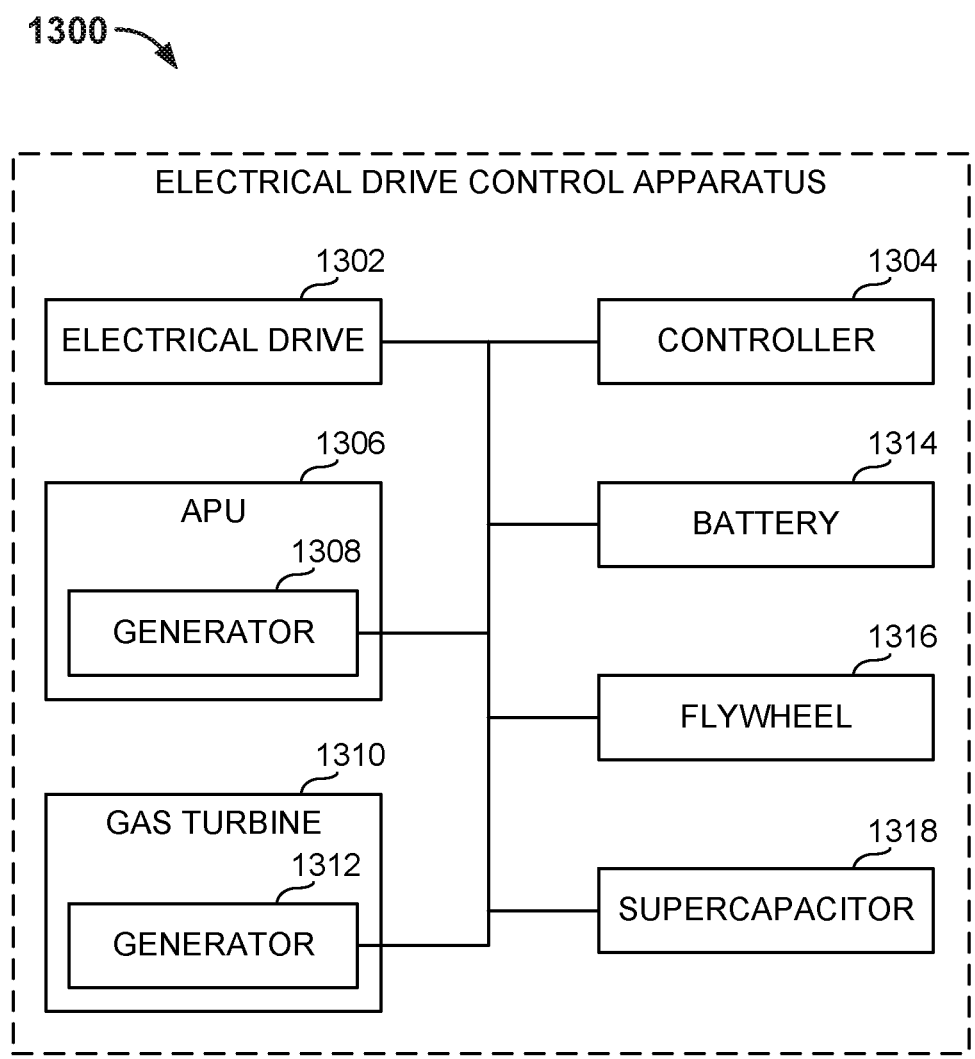
FIG. 13 is a block diagram of an example electrical drive control apparatus constructed in accordance with the teachings of this disclosure.

In some examples, the pitch control mechanism 1204 of FIG. 13 may adjust the positions of respective ones of the augmentor fan blades 940 of FIGS. 9-12 such that rotation of the augmentor fan blades 940 via the augmentor hub ring 938 of FIGS. 9-12 generates a thrust in a direction that is opposite relative to a direction of a thrust generated via rotation of the ducted fan blades 914 of FIGS. 9-12 during normal forward flight. The pitch control mechanism 1204 of FIG. 12 may accordingly cause the augmentor fan blades 940 and/or, more generally, the augmentor fan 936 of FIGS. 9-12 to function and/or operate as a thrust reverser, with reverse thrust blade orientations achieved either through fine pitch or through feather pitch. In some examples, implementing the pitch control mechanism 1204 of FIG. 12 as a thrust reverser may allow for the omission and/or elimination of a conventional thrust reverser (e.g., blocker doors, cascade reversers, translating cascades, clamshell reverser members, multi-door reverser members, etc.) from the nacelle 920. Augmentor blade pitch angle values may also be set to an orientation to enable regenerative braking during aircraft descent, by slowing aircraft speed and reversing power flow from the motors so they can serve as generators.

In the illustrated example of FIGS. 9-12, the augmentor hub ring 938, the augmentor fan blades 940 and/or, more generally, the augmentor fan 936 is/are positioned forward of the wing 932 of the aircraft. In other example, the augmentor hub ring 938, augmentor fan blades 940 and/or, more generally, the augmentor fan 936 of FIGS. 9-12 may alternatively be positioned rearward of the wing 932 of the aircraft. In the illustrated example of FIGS. 9-12, the augmentor hub ring 938 is positioned approximately midway between the leading edge 926 and the trailing edge 928 of the nacelle 920 of FIGS. 9-12. In other examples, the augmentor hub ring 938 of FIGS. 9-12 may alternatively be positioned at and/or proximate the leading edge 926 of the nacelle 920. In still other examples, the augmentor hub ring 938 of FIGS. 9-12 may alternatively be positioned at and/or proximate the trailing edge 928 of the nacelle 920.

In the illustrated example of FIGS. 9-12, the augmentor fan 936 and the ducted fan 908 are separately and/or independently rotatable. In some examples, the augmentor fan 936 is electrically driven via the electrical drive(s) 942 of FIGS. 9-12, and the ducted fan 908 is mechanically driven via the engine shaft 910 and/or the core engine 906 of FIGS. 9-12, thereby providing for an aircraft propulsor that is hybrid in nature (e.g., the hybrid propulsor 902 of FIGS. 9-12). In some examples, the augmentor fan 936 of FIGS. 9-12 may rotate in a first direction (e.g., clockwise), and the ducted fan 908 of FIGS. 9-12 may rotate in a second direction (e.g., clockwise) that is the same as the first direction. In other examples, the augmentor fan 936 of FIGS. 9-12 may rotate in a first direction (e.g., clockwise), and the ducted fan 908 of FIGS. 9-12 may rotate in a second direction (e.g., counterclockwise) that is opposite the first direction.

FIG. 13 is a block diagram of an example electrical drive control apparatus 1300 constructed in accordance with the teachings of this disclosure. The electrical drive control apparatus 1300 of FIG. 13 may be integrated and/or otherwise incorporated into an aircraft to operate a hybrid aircraft propulsor of the aircraft having an electrically-driven augmentor fan (e.g., the hybrid propulsor 902 of FIGS. 9-12, the hybrid propulsor 1602 of FIGS. 16 and 17, the hybrid propulsor 1802 of FIGS. 18 and 19, the hybrid propulsor 2302 of FIGS. 23 and 24, the hybrid propulsor 2502 of FIGS. 25 and 26, etc.). In the illustrated example of FIG. 13, the electrical drive control apparatus 1300 includes an example electrical drive 1302, an example controller 1304, an example auxiliary power unit (APU) 1306 having an example electrical generator 1308, an example gas turbine 1310 having an example electrical generator 1312, an example battery 1314, an example flywheel 1316, and an example supercapacitor 1318. In other examples, the electrical drive control apparatus 1300 may lack one or more of the auxiliary power unit 1306, the gas turbine 1310, the battery 1314, the flywheel 1316, and/or the supercapacitor 1318 of FIG. 13.

In the illustrated example of FIG. 13, the connecting lines shown between various ones of the electrical drive 1302, the controller 1304, the auxiliary power unit 1306 having the electrical generator 1308, the gas turbine 1310 having the electrical generator 1312, the battery 1314, the flywheel 1316, and the supercapacitor 1318 represent operative couplings that include power connections as well as signal connections. For example, the connecting lines of FIG. 13 represent power connections that may include electrical wire for conducting electrical energy or power. The connecting lines of FIG. 13 further represent signal connections that may include electrical or optical wire and/or cable, or electrical or optical data buses, for transmitting and/or carrying signals such as sensor signals, command signals, control signals, etc.

In the illustrated example of FIG. 13, the electrical drive 1302 is operatively coupled (e.g., via one or more wire(s) and/or electrical conduit(s)) to respective ones of the electrical generator 1308 of the auxiliary power unit 1306, the electrical generator 1312 of the gas turbine 1310, the battery 1314, the flywheel 1316, and/or the supercapacitor 1318. The electrical drive 1302 of FIG. 13 may be implemented via one or more of the example electrical drive(s) 942 of FIGS. 9-12 described above. The electrical drive 1302 of FIG. 13 rotates an augmentor hub ring of an augmentor fan (e.g., the augmentor hub ring 938 of the augmentor fan 936 of FIGS. 9-12) in response to a supply of electrical energy provided to the electrical drive 1302 from one or more electrical energy source(s). In the illustrated example of FIG. 13, the electrical energy source(s) include any and/or all of the electrical generator 1308 of the auxiliary power unit 1306, the electrical generator 1312 of the gas turbine 1310, the battery 1314, the flywheel 1316, and/or the supercapacitor 1318. The electrical generator 1308 of the auxiliary power unit 1306 of FIG. 13 and the electrical generator 1312 of the gas turbine 1310 of FIG. 13 are example electrical energy generating devices capable of generating electrical energy to be supplied to the electrical drive 1302 of FIG. 13. The battery 1314, the flywheel 1316, and the supercapacitor 1318 of FIG. 13 are example electrical energy storage devices capable of storing electrical energy to be supplied to the electrical drive 1302 of FIG. 13. The electrical drive control apparatus 1300 of FIG. 13 may additionally or alternatively include other types of electrical energy generating devices and/or other types of electrical energy storage devices commonly found in aircraft.

In the illustrated example of FIG. 13, the controller 1304 is operatively coupled to the electrical drive 1302, and is also operatively coupled to the electrical generator 1308 of the auxiliary power unit 1306, the electrical generator 1312 of the gas turbine 1310, the battery 1314, the flywheel 1316, and/or the supercapacitor 1318. The controller 1304 of FIG. 13 controls, manages and/or regulates the supply of electrical energy to and/or the conversion of electrical energy by the electrical drive 1302 of FIG. 13. For example, the controller 1304 may control a flow of electrical energy to be supplied to the electrical drive 1302 as provided by one or more of the electrical generator 1308 of the auxiliary power unit 1306, the electrical generator 1312 of the gas turbine 1310, the battery 1314, the flywheel 1316, and/or the supercapacitor 1318 of FIG. 13. In the illustrated example of FIG. 13, the electrical drive 1302 rotates an augmentor hub ring of an augmentor fan (e.g., the augmentor hub ring 938 of the augmentor fan 936 of FIGS. 9-12) at specific speeds (e.g., specific angular velocities) and/or specific times based on the extent and/or degree of the controlled electrical energy supplied to the electrical drive 1302 via the controller 1304, and/or based on the timing at which the controller 1304 provides such controlled electrical energy to the electrical drive 1302. In some examples, the controller 1304 of FIG. 13 may additionally be operatively coupled to one or more sensor(s) and/or interface(s) including, for example, a pilot interface (e.g., one or more input device(s) and/or output device(s)), a thrust management system interface, and/or a flight management system interface. In such examples, the controller 1304 of FIG. 13 may receive input(s) from and/or provide output(s) to the sensor(s) and/or the interface(s) to facilitate and/or provide an indication of one or more operation(s) associated with the controller 1304, including for example the control, management and/or regulation of the supply of electrical energy to, and/or the conversion of electrical energy by, the electrical drive 1302 of FIG. 13.

Figure 14:
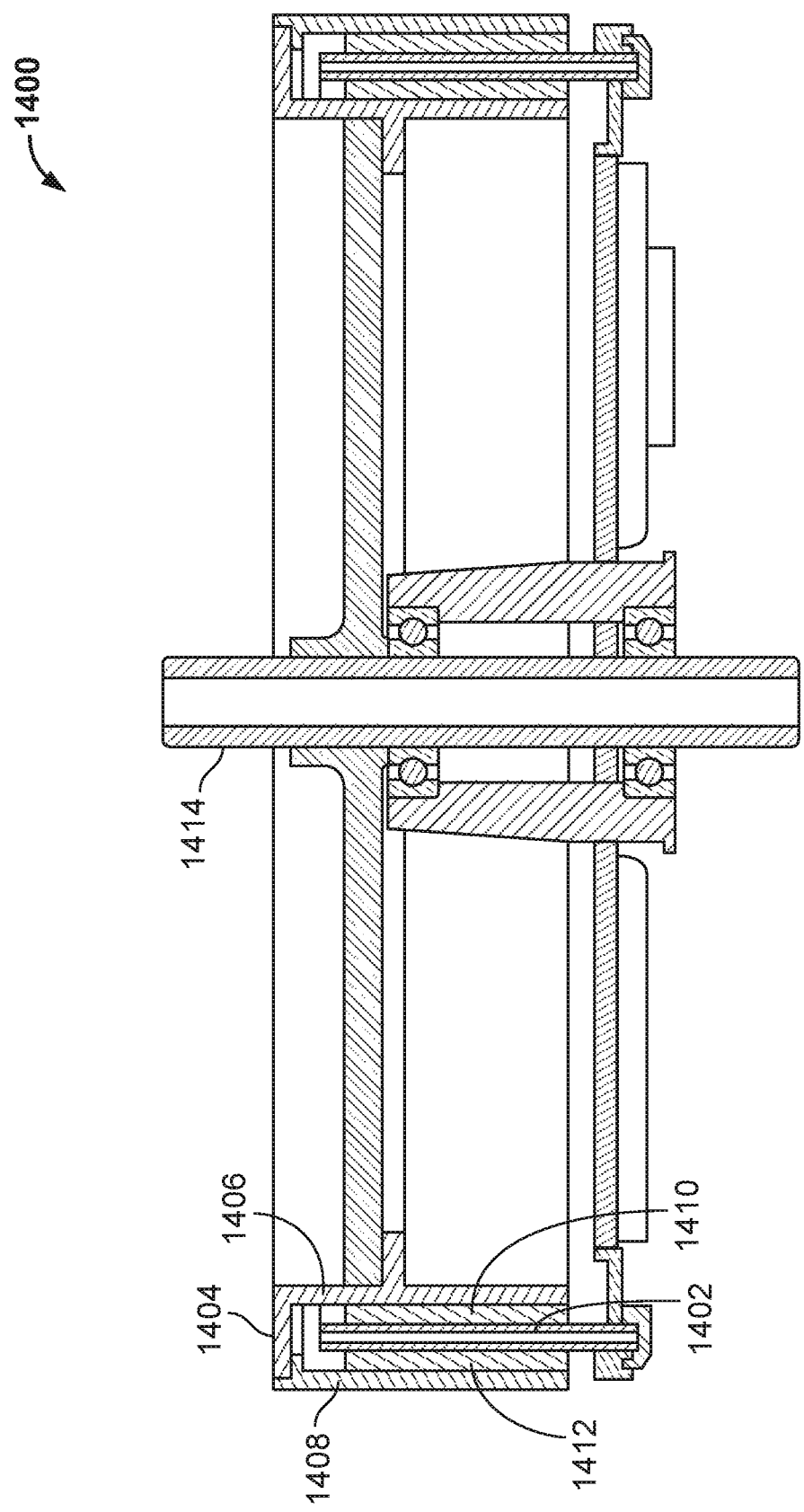
FIG. 14 is a side cross-sectional view of a first known brushless ring motor.

FIG. 14 is a side cross-sectional view of a first known brushless ring motor 1400. The brushless ring motor 1400 of FIG. 14 includes a stator 1402 and a rotor 1404. The stator 1402 of FIG. 14 is stationary. The rotor 1404 of FIG. 14 rotates relative to the stator 1402. The rotor 1404 includes an inner wall 1406 and an outer wall 1408. As shown in FIG. 14, one or more inner magnet(s) 1410 are coupled to an outer surface of the inner wall 1406 of the rotor 1404, and one or more outer magnet(s) 1412 are coupled to an inner surface of the outer wall 1408 of the rotor 1404 such that the outer magnet(s) 1412 face the inner magnet(s) 1410. The stator 1402 of FIG. 14 is positioned between the inner magnet(s) 1410 of the inner wall 1406 of the rotor 1404 and the outer magnet(s) 1412 of the outer wall 1408 of the rotor 1404 of FIG. 14. An electric field generated via the stator 1402 of FIG. 14 is applied to the inner magnet(s) 1410 and the outer magnet(s) 1412. The inner wall 1406 and the outer wall 1408 of the rotor 1404 of FIG. 14 rotate together in response to the application of the electric field. Rotation of the rotor 1404 of FIG. 14 causes an output shaft 1414 coupled to the rotor 1404 to rotate. One or more of the electrical drive(s) 942 of FIGS. 9-12 described above may be implemented via the brushless ring motor 1400 of FIG. 14 or a modified form and/or version thereof.

Figure 15:
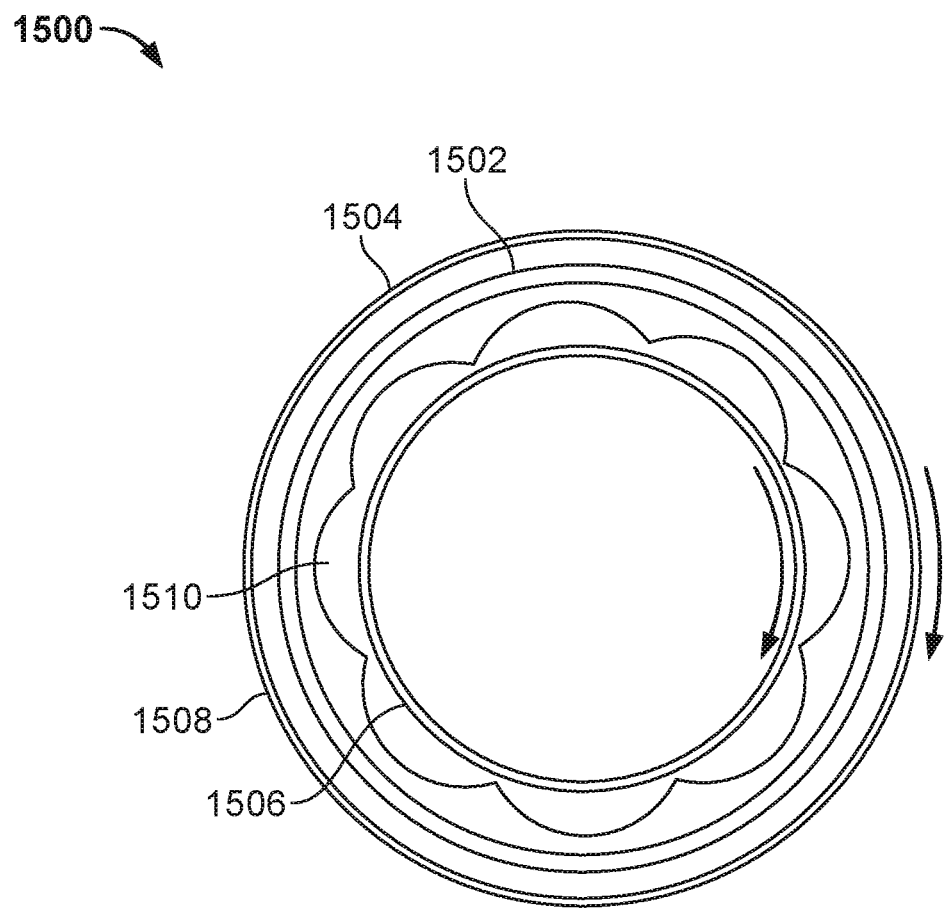
FIG. 15 is a front cross-sectional view of a second known brushless ring motor.

FIG. 15 is a front cross-sectional view of a second known brushless ring motor 1500. The brushless ring motor 1500 of FIG. 15 includes a stator 1502 and a rotor 1504. The stator 1502 of FIG. 15 is stationary. The rotor 1504 of FIG. 15 rotates relative to the stator 1502. The rotor 1504 includes an inner wall 1506 and an outer wall 1508. As shown in FIG. 15, one or more inner magnet(s) 1510 are coupled to an outer surface of the inner wall 1506 of the rotor 1504. One or more outer magnet(s) (not shown in FIG. 15) may additionally be coupled to an inner surface of the outer wall 1508 of the rotor 1504 such that the outer magnet(s) face the inner magnet(s) 1510. The stator 1502 of FIG. 15 is positioned between the inner wall 1506 of the rotor 1504 and the outer wall 1508 of the rotor 1504 of FIG. 15. An electric field generated via the stator 1502 of FIG. 15 is applied to the inner magnet(s) 1510, and to the outer magnet(s) if present. The inner wall 1506 and the outer wall 1508 of the rotor 1504 of FIG. 15 rotate together in response to the application of the electric field. One or more of the electrical drive(s) 942 of FIGS. 9-12 described above may be implemented via the brushless ring motor 1500 of FIG. 15 or a modified form and/or version thereof.

Figures 16, 17:
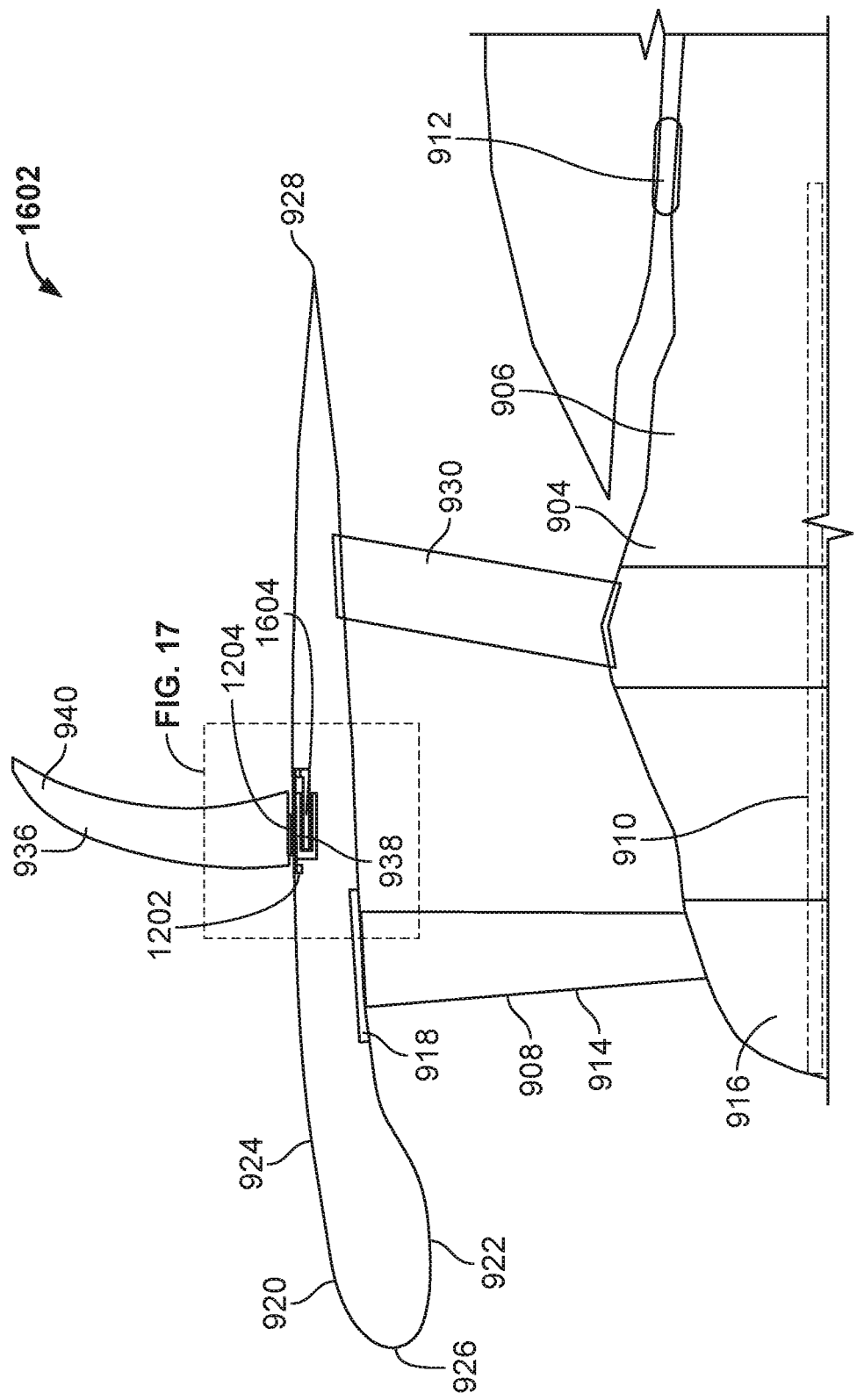
FIG. 16 is a side cross-sectional view of a second example hybrid propulsor including a first example brushless ring motor.
FIG. 17 is an enlarged view of a portion of FIG. 16.

FIG. 16 is a side cross-sectional view of a second example hybrid propulsor 1602 including a first example brushless ring motor 1604. FIG. 17 is an enlarged view of a portion of FIG. 16. The second example hybrid propulsor 1602 of FIGS. 16 and 17 includes the turbofan 904, the core engine 906, the ducted fan 908, the engine shaft 910, the combustion chamber 912, the ducted fan blades 914, the spinner 916, the fan cowl 918, the nacelle 920, the inner surface 922, the outer surface 924, the leading edge 926, the trailing edge 928, the duct support struts 930, the augmentor fan 936, the augmentor hub ring 938, the augmentor fan blades 940, the stewing ring bearings 1202, and the pitch control mechanism 1204 described above in connection with the first example hybrid propulsor of FIGS. 9-12. In the interest of conciseness, the respective descriptions of such items provided above are not repeated here in reference to the second example hybrid propulsor 1602 of FIGS. 16 and 17.

The example brushless ring motor 1604 of FIGS. 16 and 17 is an electric motor that may be implemented and/or function as an electrical drive to rotate the augmentor hub ring 938 of the augmentor fan 936 of FIGS. 16 and 17. The brushless ring motor 1604 of FIGS. 16 and 17 is located within and/or integrated into the nacelle 920 of FIGS. 16 and 17. The brushless ring motor 1604 rotates the augmentor hub ring 938 in response to a supply of electrical energy provided to the brushless ring motor 1604 from one or more electrical energy source(s) (not shown in FIGS. 16 and 17) located within and/or coupled to the aircraft. For example, the brushless ring motor 1604 of FIGS. 16 and 17 may rotate the augmentor hub ring 938 in response to a supply of electrical energy provided to the brushless ring motor 1604 from one or more of the electrical generator 1308 of the auxiliary power unit 1306, the electrical generator 1312 of the gas turbine 1310, the battery 1314, the flywheel 1316, and/or the supercapacitor 1318 of FIG. 13 described above.

In the illustrated example of FIGS. 16 and 17, the brushless ring motor 1604 includes an example stator 1702 and an example rotor 1704. The stator 1702 of FIG. 17 is stationary. The rotor 1704 of FIG. 17 rotates relative to the stator 1702. The rotor 1704 includes an inner wall 1706 and an outer wall 1708. As shown in FIG. 17, one or more inner magnet(s) 1710 are coupled to an outer surface of the inner wall 1706 of the rotor 1704, and one or more outer magnet(s) 1712 are coupled to an inner surface of the outer wall 1708 of the rotor 1704 such that the outer magnet(s) 1712 face the inner magnet(s) 1710. The stator 1702 of FIG. 17 is positioned between the inner magnet(s) 1710 of the inner wall 1706 of the rotor 1704 and the outer magnet(s) 1712 of the outer wall 1708 of the rotor 1704 of FIG. 17. An electric field generated via the stator 1702 of FIG. 17 is applied to the inner magnet(s) 1710 and the outer magnet(s) 1712. The inner wall 1706 and the outer wall 1708 of the rotor 1704 of FIG. 17 rotate together in response to the application of the electric field. The augmentor hub ring 938 of the augmentor fan 936 of FIGS. 16 and 17 is coupled to the rotor 1704 of the brushless ring motor 1604 of FIGS. 16 and 17 such that the augmentor hub ring 938 rotates along with the rotor 1704 (e.g., such that rotation of the rotor 1704 causes rotation of the augmentor hub ring 938).

Figure 19:
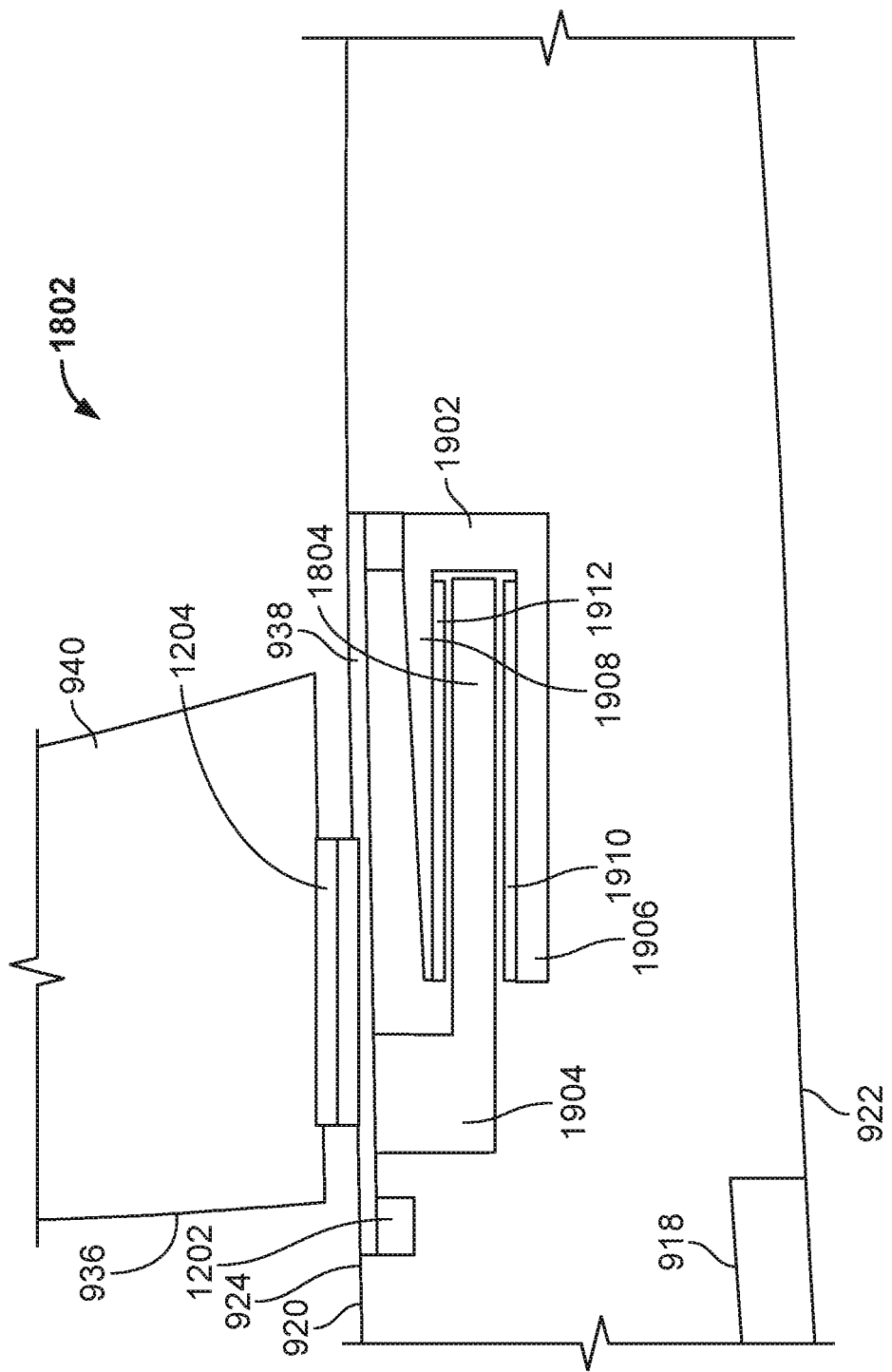
FIG. 19 is an enlarged view of a portion of FIG. 18.

FIG. 18 is a side cross-sectional view of a third example hybrid propulsor 1802 including a second example brushless ring motor 1804. FIG. 19 is an enlarged view of a portion of FIG. 18. The third example hybrid propulsor 1802 of FIGS. 18 and 19 includes the turbofan 904, the core engine 906, the ducted fan 908, the engine shaft 910, the combustion chamber 912, the ducted fan blades 914, the spinner 916, the fan cowl 918, the nacelle 920, the inner surface 922, the outer surface 924, the leading edge 926, the trailing edge 928, the duct support struts 930, the augmentor fan 936, the augmentor hub ring 938, the augmentor fan blades 940, the stewing ring bearings 1202, and the pitch control mechanism 1204 described above in connection with the first example hybrid propulsor of FIGS. 9-12. In the interest of conciseness, the respective descriptions of such items provided above are not repeated here in reference to the third example hybrid propulsor 1802 of FIGS. 18 and 19.

The example brushless ring motor 1804 of FIGS. 18 and 19 is an electric motor that may be implemented and/or function as an electrical drive to rotate the augmentor hub ring 938 of the augmentor fan 936 of FIGS. 18 and 19. The brushless ring motor 1804 of FIGS. 18 and 19 is located within and/or integrated into the nacelle 920 of FIGS. 18 and 19. The brushless ring motor 1804 rotates the augmentor hub ring 938 in response to a supply of electrical energy provided to the brushless ring motor 1804 from one or more electrical energy source(s) (not shown in FIGS. 18 and 19) located within and/or coupled to the aircraft. For example, the brushless ring motor 1804 of FIGS. 18 and 19 may rotate the augmentor hub ring 938 in response to a supply of electrical energy provided to the brushless ring motor 1804 from one or more of the electrical generator 1308 of the auxiliary power unit 1306, the electrical generator 1312 of the gas turbine 1310, the battery 1314, the flywheel 1316, and/or the supercapacitor 1318 of FIG. 13 described above.

In the illustrated example of FIGS. 18 and 19, the brushless ring motor 1804 includes an example stator 1902 and an example rotor 1904. The stator 1902 of FIG. 19 is stationary. The rotor 1904 of FIG. 19 rotates relative to the stator 1902. The stator 1902 includes an inner wall 1906 and an outer wall 1908. As shown in FIG. 19, one or more inner magnet (s) 1910 are coupled to an outer surface of the inner wall 1906 of the stator 1902, and one or more outer magnet(s) 1912 are coupled to an inner surface of the outer wall 1908 of the stator 1902 such that the outer magnet(s) 1912 face the inner magnet(s) 1910. The rotor 1904 of FIG. 19 is positioned between the inner magnet(s) 1910 of the inner wall 1906 of the stator 1902 and the outer magnet(s) 1912 of the outer wall 1908 of the stator 1902 of FIG. 19. An electric field generated via the rotor 1904 of FIG. 19 is applied to the inner magnet(s) 1910 and the outer magnet(s) 1912. The rotor 1904 of FIG. 19 rotates in response to the application of the electric field. The augmentor hub ring 938 of the augmentor fan 936 of FIGS. 18 and 19 is coupled to the rotor 1904 of the brushless ring motor 1804 of FIGS. 18 and 19 such that the augmentor hub ring 938 rotates along with the rotor 1904 (e.g., such that rotation of the rotor 1904 causes rotation of the augmentor hub ring 938).

Figure 22:
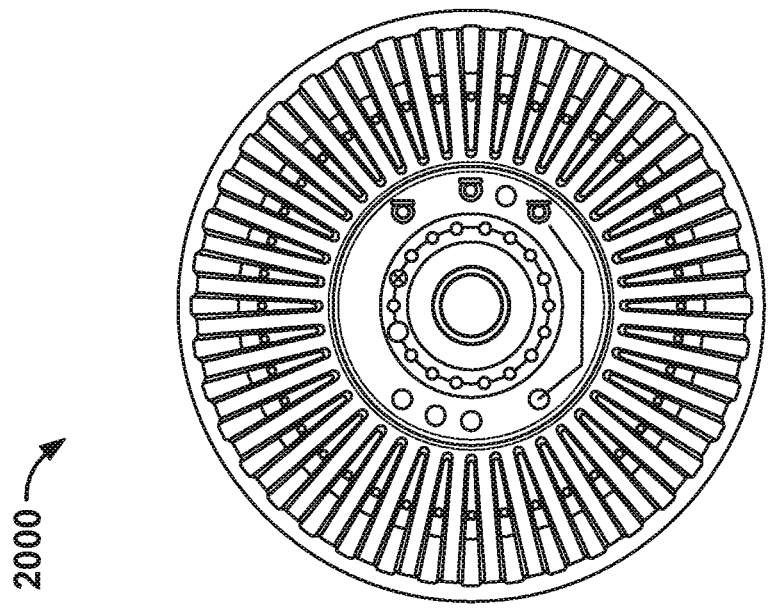
FIG. 22 is a rear view of the known axial flux synchronous permanent magnet motor of FIGS. 20 and 21.
Figure 21:
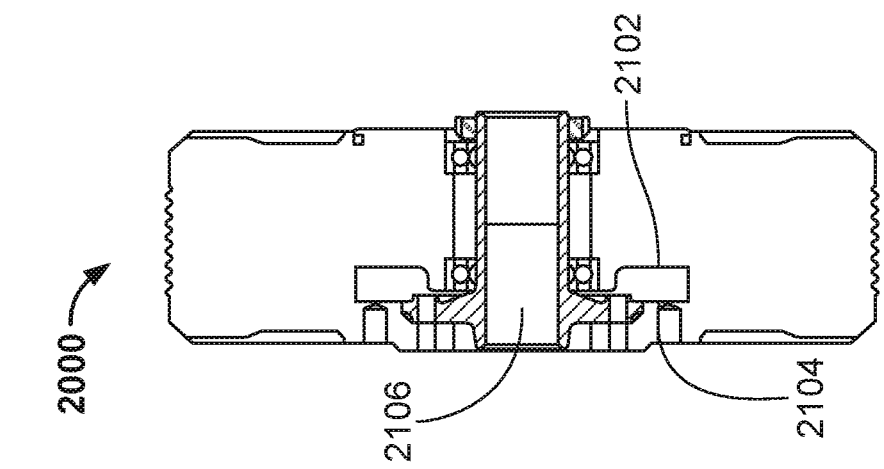
FIG. 21 is a side cross-sectional view of the known axial flux synchronous permanent magnet motor of FIG. 20.
Figure 20:
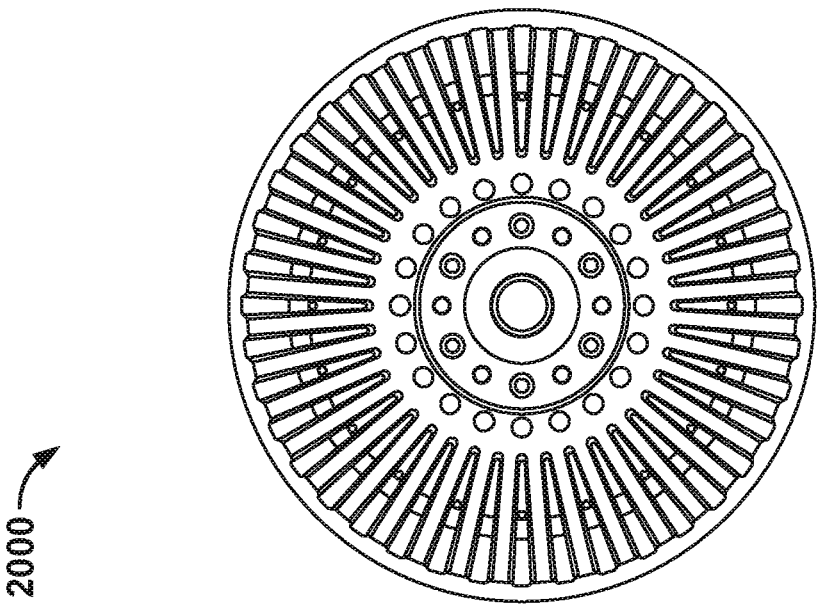
FIG. 20 is a front view of a known axial flux synchronous permanent magnet motor.

FIG. 20 is a front view of a known axial flux synchronous permanent magnet motor 2000. FIG. 21 is a side cross-sectional view of the known axial flux synchronous permanent magnet motor 2000 of FIG. 20. FIG. 22 is a rear view of the known axial flux synchronous permanent magnet motor 2000 of FIGS. 20 and 21. The axial flux synchronous permanent magnet motor 2000 of FIGS. 20-22 includes a stator 2102 and a rotor 2104. The stator 2102 of FIG. 21 is stationary. The rotor 2104 of FIG. 21 rotates relative to the stator 2102 in response to an electric filed applied to one or more permanent magnet(s) of the axial flux synchronous permanent magnet motor 2000 of FIGS. 20-22 via the stator 2102 of FIG. 21. The rotor 2104 of FIG. 21 includes and/or is coupled to an output socket 2106 that rotates along with the rotor 2104. Rotational motion of the rotor 2104 and/or the output socket 2106 of FIG. 21 may be transferred to another structure and/or device via a transmission shaft (not shown in FIGS. 20-22) coupled to the output socket 2106 of the axial flux synchronous permanent magnet motor 2000 of FIGS. 20-22. One or more of the electrical drive(s) 942 of FIGS. 9-12 described above may be implemented via the axial flux synchronous permanent magnet motor 2000 of FIGS. 20-22 or a modified form and/or version thereof.

Figure 24:
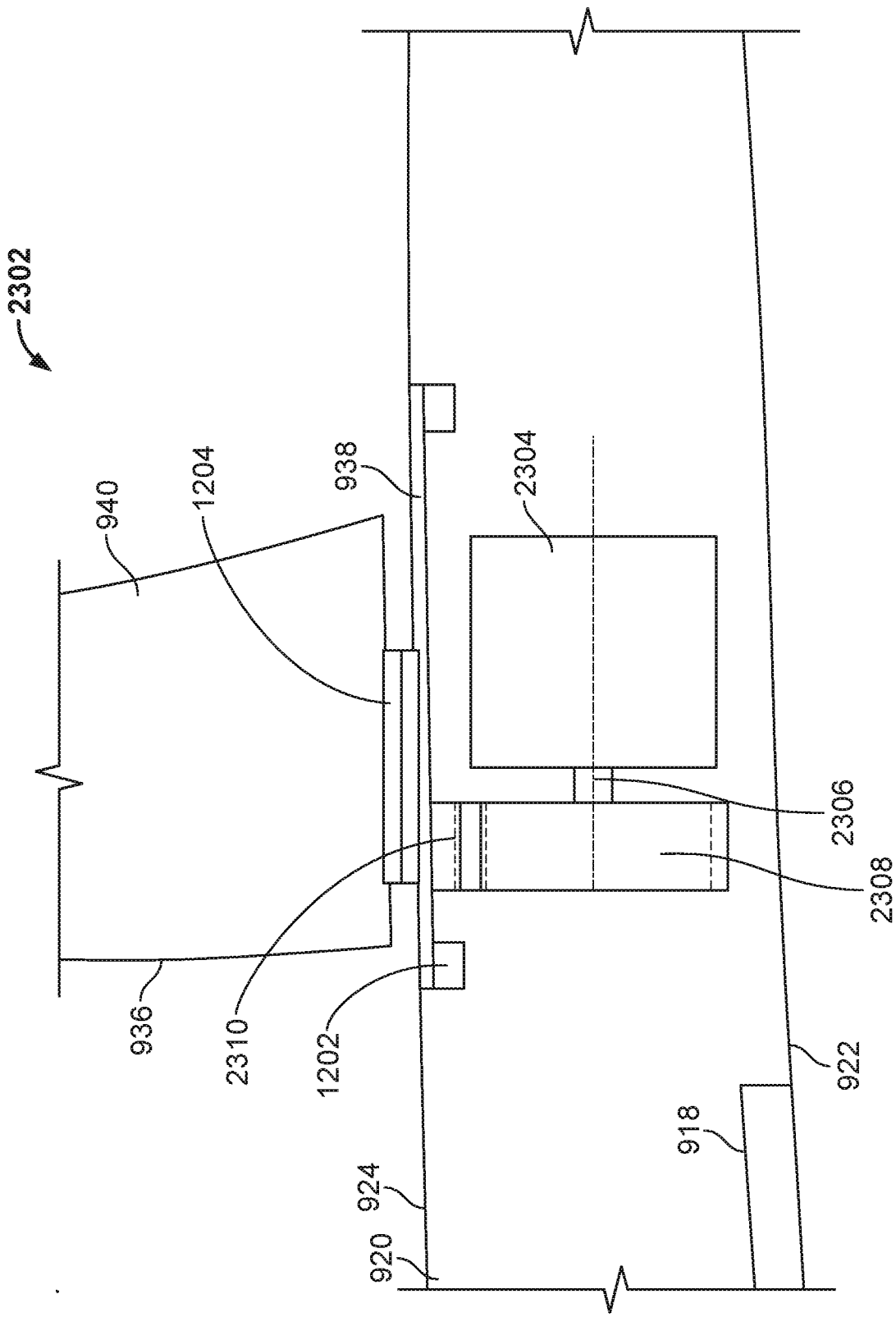
FIG. 24 is an enlarged view of a portion of FIG. 23.

FIG. 23 is a side cross-sectional view of a fourth example hybrid propulsor 2302 including a first example axial flux synchronous permanent magnet motor 2304. FIG. 24 is an enlarged view of a portion of FIG. 23. The fourth example hybrid propulsor 2302 of FIGS. 23 and 24 includes the turbofan 904, the core engine 906, the ducted fan 908, the engine shaft 910, the combustion chamber 912, the ducted fan blades 914, the spinner 916, the fan cowl 918, the nacelle 920, the inner surface 922, the outer surface 924, the leading edge 926, the trailing edge 928, the duct support struts 930, the augmentor fan 936, the augmentor hub ring 938, the augmentor fan blades 940, the stewing ring bearings 1202, and the pitch control mechanism 1204 described above in connection with the first example hybrid propulsor of FIGS. 9-12. In the interest of conciseness, the respective descriptions of such items provided above are not repeated here in reference to the fourth example hybrid propulsor 2302 of FIGS. 23 and 24.

The example axial flux synchronous permanent magnet motor 2304 of FIGS. 23 and 24 is an electric motor that may be implemented and/or function as an electrical drive to rotate the augmentor hub ring 938 of the augmentor fan 936 of FIGS. 23 and 24. The axial flux synchronous permanent magnet motor 2304 of FIGS. 23 and 24 is located within and/or integrated into the nacelle 920 of FIGS. 23 and 24. The axial flux synchronous permanent magnet motor 2304 rotates the augmentor hub ring 938 in response to a supply of electrical energy provided to the axial flux synchronous permanent magnet motor 2304 from one or more electrical energy source(s) (not shown in FIGS. 23 and 24) located within and/or coupled to the aircraft. For example, the axial flux synchronous permanent magnet motor 2304 of FIGS. 23 and 24 may rotate the augmentor hub ring 938 in response to a supply of electrical energy provided to the axial flux synchronous permanent magnet motor 2304 from one or more of the electrical generator 1308 of the auxiliary power unit 1306, the electrical generator 1312 of the gas turbine 1310, the battery 1314, the flywheel 1316, and/or the supercapacitor 1318 of FIG. 13 described above.

In the illustrated example of FIGS. 23 and 24, the axial flux synchronous permanent magnet motor 2304 is operatively coupled to the augmentor hub ring 938 of the augmentor fan 936 of FIGS. 22 and 23 via an example output shaft 2306, an example powered drive gear 2308, and an example augmentor hub ring drive gear 2310. The output shaft 2306 of FIGS. 23 and 24 is coupled to a rotor of the axial flux synchronous permanent magnet motor 2304 such that rotational motion of the rotor is transferred to the output shaft 2306. The powered drive gear 2308 of FIGS. 23 and 24 is coupled to the output shaft 2306 of FIGS. 23 and 24 such that rotational motion of the output shaft 2306 is transferred to the powered drive gear 2308. The augmentor hub ring drive gear 2310 of FIGS. 23 and 24 is rigidly coupled to the augmentor hub ring 938 of the augmentor fan 936 of FIGS. 23 and 24. The augmentor hub ring drive gear 2310 of FIGS. 23 and 24 engages the powered drive gear 2308 of FIGS. 23 and 24 such that rotational motion of the powered drive gear 2308 is transferred to the augmentor hub ring 938 of the augmentor fan 936 of FIGS. 23 and 24 via the augmentor hub ring drive gear 2310.

Figure 25:
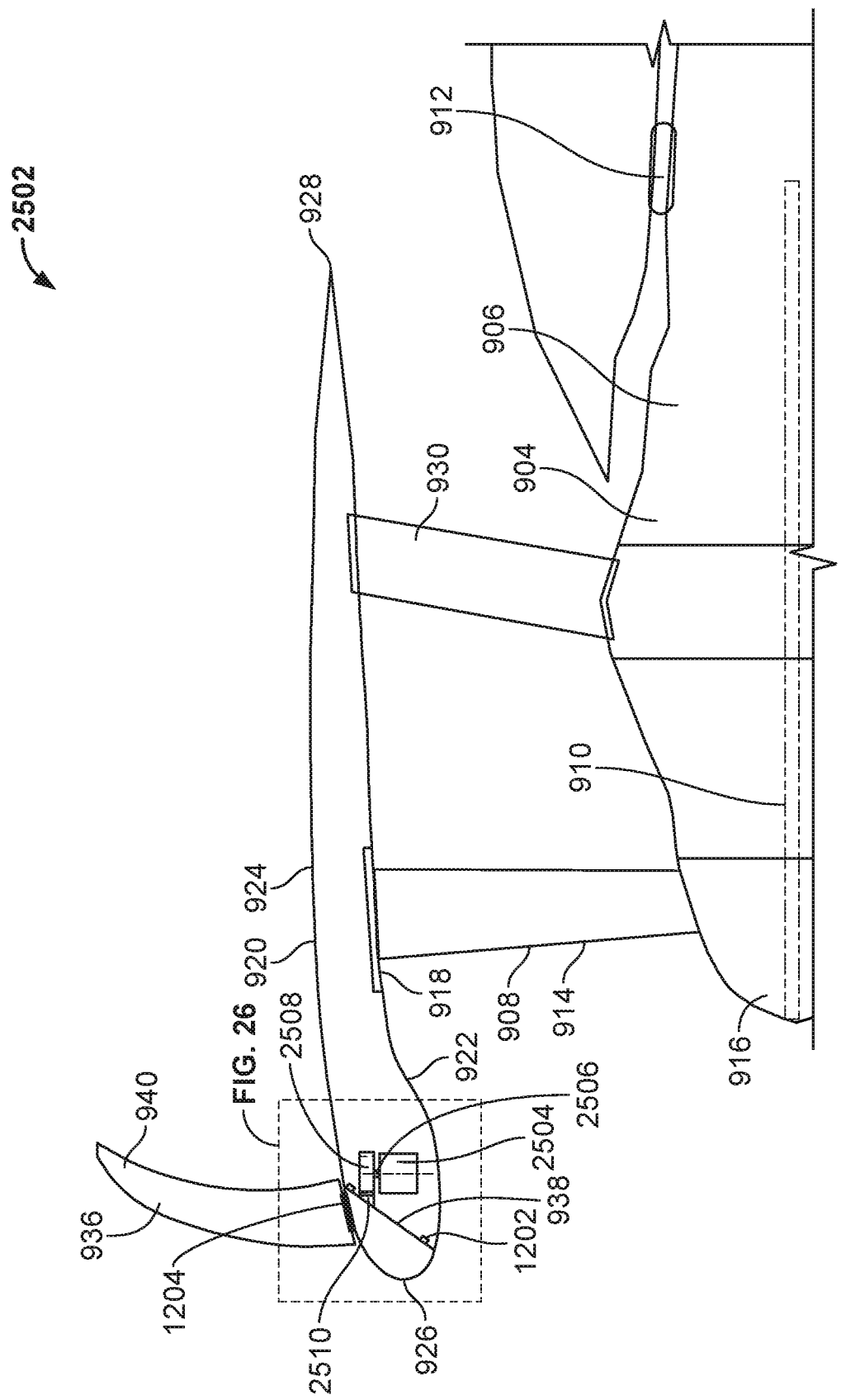
FIG. 25 is a side cross-sectional view of a fifth example hybrid propulsor including a second example axial flux synchronous permanent magnet motor.
Figure 26:
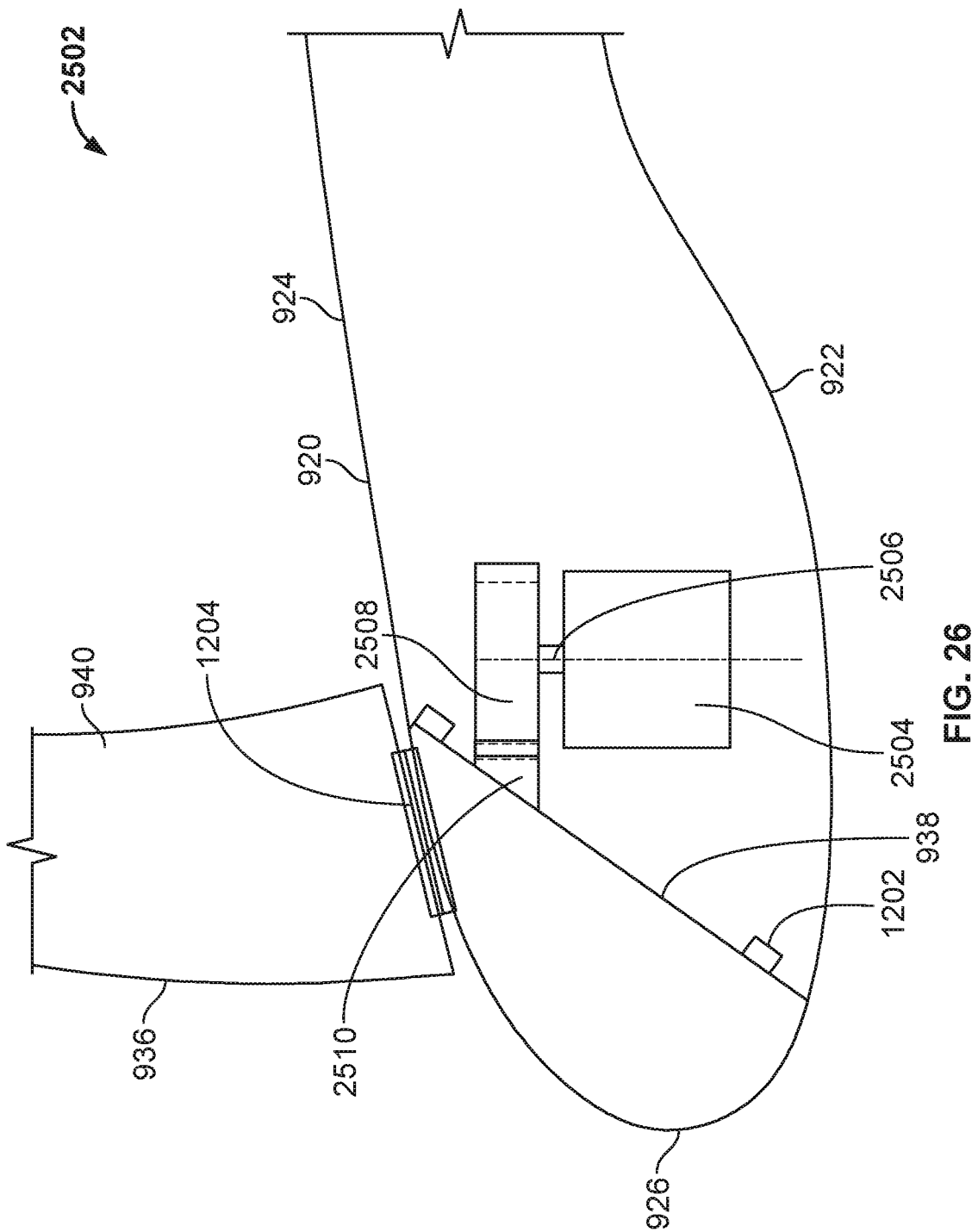
FIG. 26 is an enlarged view of a portion of FIG. 25.

FIG. 25 is a side cross-sectional view of a fifth example hybrid propulsor 2502 including a second example axial flux synchronous permanent magnet motor 2504. FIG. 26 is an enlarged view of a portion of FIG. 25. The fifth example hybrid propulsor 2502 of FIGS. 25 and 26 includes the turbofan 904, the core engine 906, the ducted fan 908, the engine shaft 910, the combustion chamber 912, the ducted fan blades 914, the spinner 916, the fan cowl 918, the nacelle 920, the inner surface 922, the outer surface 924, the leading edge 926, the trailing edge 928, the duct support struts 930, the augmentor fan 936, the augmentor hub ring 938, the augmentor fan blades 940, the electrical drive(s) 942, the stewing ring bearings 1202, and the pitch control mechanism 1204 described above in connection with the first example hybrid propulsor of FIGS. 9-12. In the interest of conciseness, the respective descriptions of such items provided above are not repeated here in reference to the fifth example hybrid propulsor 2502 of FIGS. 25 and 26. Unlike the example of FIGS. 9-12 in which the augmentor fan 936 (e.g., including the augmentor hub ring 938 and the augmentor fan blades 940) is positioned approximately midway between the leading edge 926 and the trailing edge 928 of the nacelle 920 of FIGS. 9-12, the augmentor fan 936 (e.g., including the augmentor hub ring 938 and the augmentor fan blades 940) of FIGS. 25 and 26 is positioned proximate and/or implemented as the leading edge 926 of the nacelle 920 of FIGS. 25 and 26.

The example axial flux synchronous permanent magnet motor 2504 of FIGS. 25 and 26 is an electric motor that may be implemented and/or function as an electrical drive to rotate the augmentor hub ring 938 of the augmentor fan 936 of FIGS. 25 and 26. The axial flux synchronous permanent magnet motor 2504 of FIGS. 24 and 25 is located within and/or integrated into the nacelle 920 of FIGS. 25 and 26. The axial flux synchronous permanent magnet motor 2504 rotates the augmentor hub ring 938 in response to a supply of electrical energy provided to the axial flux synchronous permanent magnet motor 2504 from one or more electrical energy source(s) (not shown in FIGS. 25 and 26) located within and/or coupled to the aircraft. For example, the axial flux synchronous permanent magnet motor 2504 of FIGS. 25 and 26 may rotate the augmentor hub ring 938 in response to a supply of electrical energy provided to the axial flux synchronous permanent magnet motor 2504 from one or more of the electrical generator 1308 of the auxiliary power unit 1306, the electrical generator 1312 of the gas turbine 1310, the battery 1314, the flywheel 1316, and/or the supercapacitor 1318 of FIG. 13 described above.

In the illustrated example of FIGS. 25 and 26, the axial flux synchronous permanent magnet motor 2504 is operatively coupled to the augmentor hub ring 938 of the augmentor fan 936 of FIGS. 25 and 26 via an example output shaft 2506, an example powered drive gear 2508, and an example augmentor hub ring drive gear 2510. The output shaft 2506 of FIGS. 25 and 26 is coupled to a rotor of the axial flux synchronous permanent magnet motor 2504 such that rotational motion of the rotor is transferred to the output shaft 2506. The powered drive gear 2508 of FIGS. 25 and 26 is coupled to the output shaft 2506 of FIGS. 25 and 26 such that rotational motion of the output shaft 2506 is transferred to the powered drive gear 2508. The augmentor hub ring drive gear 2510 of FIGS. 25 and 26 is rigidly coupled to the augmentor hub ring 938 of the augmentor fan 936 of FIGS. 25 and 26. The augmentor hub ring drive gear 2510 of FIGS. 25 and 26 engages the powered drive gear 2508 of FIGS. 25 and 26 such that rotational motion of the powered drive gear 2508 is transferred to the augmentor hub ring 938 of the augmentor fan 936 of FIGS. 25 and 26 via the augmentor hub ring drive gear 2510.

Figure 27:
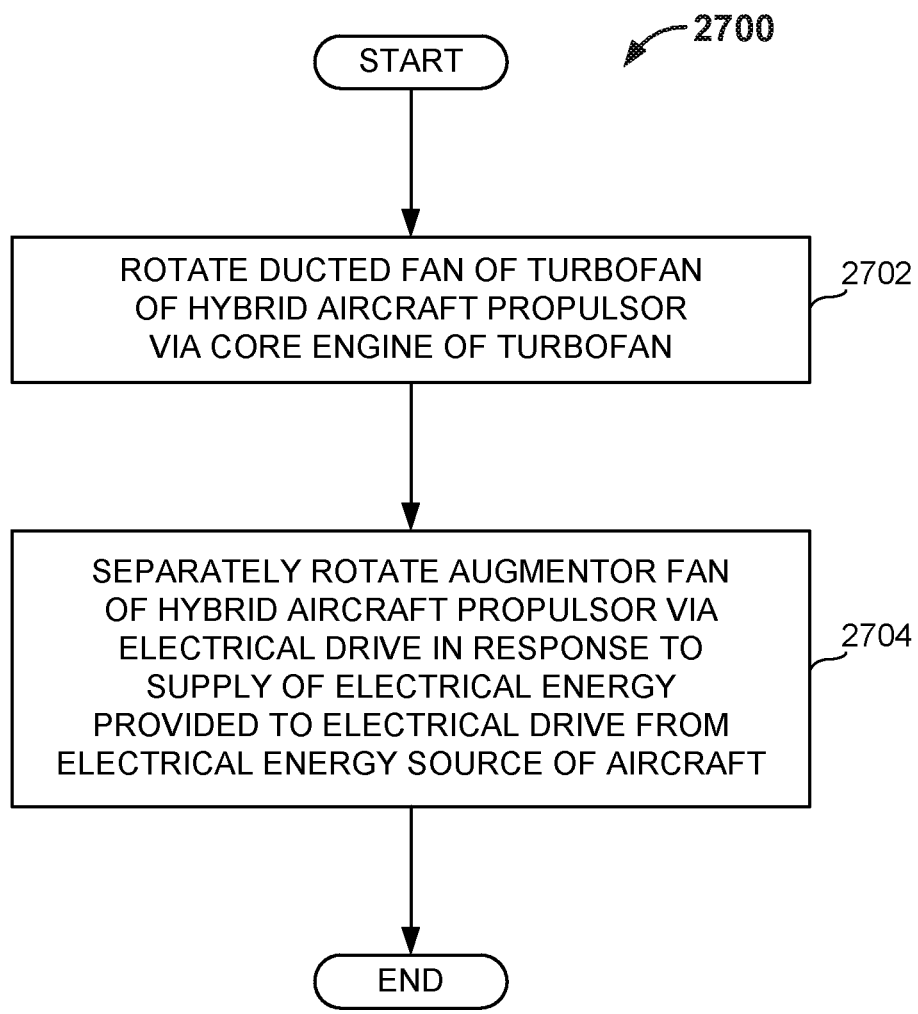
FIG. 27 is a flowchart representative of an example method for operating a hybrid aircraft propulsor having an electrically-driven augmentor fan.

FIG. 27 is a flowchart representative of an example method 2700 for operating a hybrid aircraft propulsor having an electrically-driven augmentor fan (e.g., the hybrid propulsor 902 of FIGS. 9-12 having the electrically-driven augmentor fan 936 of FIGS. 9-12). The method 2700 of FIG. 27 may be implemented in part by an electrical drive control apparatus such as the example electrical drive control apparatus 1300 of FIG. 13. The example method 2700 of FIG. 27 includes rotating a ducted fan of a turbofan via a core engine of the turbofan (block 2702). For example, the ducted fan 908 of the turbofan 904 of FIGS. 9-12 may be mechanically driven to rotate via the core engine 906 of the turbofan 904 of FIGS. 9-12 in response to a combustion process occurring in the core engine 906.

The example method 2700 of FIG. 27 also includes rotating an augmentor fan via an electrical drive in response to a supply of electrical energy provided to the electrical drive (block 2704). For example, the augmentor fan 936 of FIGS. 9-12 may be electrically driven to rotate via the electrical drive(s) 942 of FIGS. 9-12 in response to a supply of electrical energy provided to the electrical drive(s) 942 from one or more electrical energy source(s). Such energy source(s) may include, for example, one or more of the electrical generator 1308 of the auxiliary power unit 1306, the electrical generator 1312 of the gas turbine 1310, the battery 1314, the flywheel 1316, and/or the supercapacitor 1318 of FIG. 13. In some examples, the flow and/or supply of electrical energy to be provided to the electrical drive may be controlled, managed and/or regulated via a controller. For example, the controller 1304 of the electrical drive control apparatus 1300 of FIG. 13 may control, manage and/or regulate the flow and/or supply of electrical energy from the above-described electrical energy source(s) of FIG. 13 to the electrical drive 1302 of FIG. 13, which may be implemented via the electrical drive(s) 942 of FIGS. 9-12. In some examples, the rotating of the augmentor fan (block 2704) is separate from the rotating of the ducted fan (block 2702) such that the augmentor fan rotates separately and/or independently from the ducted fan. For example, the rotating of the electrically-driven augmentor fan 936 of FIGS. 9-12 is separate from the rotating of the mechanically-driven ducted fan 908 of FIGS. 9-12 such that the augmentor fan 936 rotates separately and/or independently from the ducted fan 908. Following block 2704, the example method 2700 of FIG. 27 ends.

From the foregoing, it will be appreciated that hybrid aircraft propulsors having electrically-driven augmentor fans are disclosed. As a result of being powered by electrical energy as opposed being powered mechanically and/or by jet fuel, the disclosed electrically-driven augmentor fans advantageously provide increases in fuel efficiency and reductions in operating costs relative to the mechanically-drive and/or air-driven augmentor fans described in U.S. Pat. No. 8,689,538 and U.S. Patent Publication No. 2017/0122257, as referenced above. The disclosed hybrid propulsors and/or electrically-driven augmentor fans also advantageously provide environmental benefits such as reduced carbon emissions.

The disclosed hybrid propulsors and/or electrically-driven augmentor fans advantageously leverage electrical energy produced and/or stored by conventional electrical energy sources of an aircraft. For example, the disclosed electrically-driven augmentor fans may receive a supply of electrical energy generated by an electrical generator of an auxiliary power unit and/or by an electrical generator of a gas turbine of an aircraft implementing the disclosed hybrid propulsors. The disclosed electrically-driven augmentor fans may additionally or alternatively receive a supply of electrical energy from one or more electrical energy storage device(s) of the aircraft, including, for example, a battery, a flywheel, and/or a supercapacitor.

As a result of being powered by an electrical energy source as opposed to being powered mechanically and/or by jet fuel, an electrically-driven augmentor fan of the disclosed hybrid propulsors is separately and/or independently rotatable relative to a mechanically-driven ducted fan of a turbofan of the disclosed hybrid propulsors. In some examples, the electrically-driven augmentor fan may advantageously remain operable in instances in which the mechanically-driven ducted fan stalls and/or fails. In some examples, some fan thrust associated with the electrically-driven augmentor fan may remain available following failure of a turbofan engine. The remaining available fan thrust may provide substantial benefits for an aircraft, and particularly for a twin-engine aircraft. For example, the remaining available fan thrust may advantageously provide additional total available thrust and reduced engine-failure yawing moment following a failure of a turbofan engine, thereby providing synergistic benefits in aircraft thrust sizing, vertical fin and rudder sizing, aircraft weight, and aircraft fuel efficiency. In some examples, the electrically-driven augmentor fan may be rotated at a different time and/or in a different direction relative to the time and/or direction at which the mechanically-driven ducted fan is rotated. In some such examples, the electrically-driven augmentor fan may function and/or operate as a thrust reverser having an associated direction of thrust that is opposite a direction of thrust provided by the mechanically-driven ducted fan.

In some examples, an apparatus is disclosed. In some disclosed examples, the apparatus comprises a turbofan including a core engine and a ducted fan to be rotated via the core engine. In some disclosed examples, the ducted fan includes a plurality of ducted fan blades arranged circumferentially around the core engine and circumscribed by a nacelle. In some disclosed examples, the apparatus further comprises an augmentor fan including an augmentor hub ring and a plurality of augmentor fan blades. In some disclosed examples, the augmentor fan blades are arranged circumferentially around the augmentor hub ring and project outwardly relative to an outer surface of the nacelle. In some disclosed examples, the augmentor fan is to rotate separately from the ducted fan. In some disclosed examples, the apparatus further comprises an electrical drive to rotate the augmentor hub ring in response to a supply of electrical energy provided to the electrical drive.

In some disclosed examples, the electrical drive is located between the outer surface and an inner surface of the nacelle. In some disclosed examples, the electrical drive includes an electric motor. In some disclosed examples, the electric motor is one of a brushless ring motor or an axial flux synchronous permanent magnet motor. In some disclosed examples, the electrical drive includes a plurality of electric motors located between the outer surface and the inner surface of the nacelle and arranged circumferentially around the inner surface.

In some disclosed examples, the apparatus further comprises a controller to control the supply of electrical energy provided to the electrical drive. In some disclosed examples, the supply of electrical energy is generated via an electrical generator of an auxiliary power unit, the electrical generator being operatively coupled to the electrical drive. In some disclosed examples, the supply of electrical energy is generated via an electrical generator of a gas turbine, the electrical generator being operatively coupled to the electrical drive. In some disclosed examples, the supply of electrical energy is provided via an electrical energy storage device operatively coupled to the electrical drive. In some disclosed examples, the electrical energy storage device is one of a battery, a flywheel, or a supercapacitor.

In some disclosed examples, an outer surface of the augmentor hub ring is substantially aligned with the outer surface of the nacelle. In some disclosed examples, the augmentor hub ring is located aft of the ducted fan blades. In some disclosed examples, the augmentor hub ring is located forward of the ducted fan blades. In some disclosed examples, the augmentor fan further includes a pitch control mechanism to adjust a pitch angle of the augmentor fan blades.

In some examples, an apparatus is disclosed. In some disclosed examples, the apparatus comprises a turbofan including a core engine and a ducted fan to be rotated via the core engine. In some disclosed examples, the ducted fan includes a plurality of ducted fan blades arranged circumferentially around the core engine and circumscribed by a nacelle. In some disclosed examples, the apparatus further comprises an augmentor fan including an augmentor hub ring and a plurality of augmentor fan blades. In some disclosed examples, the augmentor fan blades are arranged circumferentially around the augmentor hub ring and project outwardly relative to an outer surface of the nacelle. In some disclosed examples, the augmentor fan is to rotate separately from the ducted fan. In some disclosed examples, the apparatus further comprises means for driving the augmentor hub ring to rotate in response to a supply of electrical energy provided to the means for driving.

In some disclosed examples, the apparatus further comprises means for generating the supply of electrical energy to be provided to the means for driving. In some disclosed examples, the means for generating is operatively coupled to the means for driving. In some disclosed examples, the apparatus further comprises means for storing the supply of electrical energy to be provided to the means for driving. In some disclosed examples, the means for storing is operatively coupled to the means for driving.

In some examples, a method is disclosed. In some disclosed examples, the method comprises rotating a ducted fan of a turbofan via a core engine of the turbofan. In some disclosed examples, the ducted fan includes a plurality of ducted fan blades arranged circumferentially around the core engine and circumscribed by a nacelle. In some disclosed examples, the method further comprises rotating an augmentor fan via an electrical drive in response to a supply of electrical energy provided to the electrical drive. In some disclosed examples, the augmentor fan includes an augmentor hub ring and a plurality of augmentor fan blades. In some disclosed examples, the augmentor fan blades are arranged circumferentially around the augmentor hub ring and project outwardly relative to an outer surface of the nacelle. In some disclosed examples, the rotating of the augmentor fan is separate from the rotating of the ducted fan.

In some disclosed examples, the method further comprises generating the electrical energy to be supplied to the electrical drive. In some disclosed examples, the electrical energy is to be generated via an electrical generator operatively coupled to the electrical drive, the electrical generator being included in one of an auxiliary power unit or a gas turbine. In some disclosed examples, the method further comprises storing the electrical energy to be supplied to the electrical drive. In some disclosed examples, the electrical energy is to be stored via an electrical energy storage device operatively coupled to the electrical drive. In some disclosed examples, the electrical energy storage device is one of a battery, a flywheel, or a supercapacitor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. In some examples, hybrid aircraft propulsors having electrically-driven augmentor fans as disclosed above may be combined with one or more of the alternate drive systems described in U.S. Pat. No. 8,689,538 and/or U.S. Patent Publication No. 2017/0122257 to provide variant hybrid systems incorporating plural and/or selectable power transmission mechanisms into an augmentor fan.

What is claimed is:

1. An apparatus, comprising:
a turbofan including a core engine and a ducted fan to be rotated via the core engine, the ducted fan including a plurality of ducted fan blades arranged circumferentially around the core engine and circumscribed by a nacelle, the nacelle forming an outermost housing of the turbofan and circumscribing a bypass duct associated with the turbofan, the ducted fan blades being located within the bypass duct;
an augmentor fan configured to increase a bypass ratio associated with rotation of the ducted fan within the bypass duct, the augmentor fan including an augmentor hub ring and a plurality of augmentor fan blades, the augmentor fan blades being arranged circumferentially around the augmentor hub ring and projecting outwardly relative to an outer surface of the nacelle, the augmentor fan to rotate separately from the ducted fan; and an electrical drive to rotate the augmentor hub ring in response to a supply of electrical energy provided to the electrical drive, the electrical drive being located radially outward of the bypass duct and between the outer surface and an inner surface of the nacelle.

2. The apparatus of claim 1, wherein the electrical drive includes an electric motor.

3. The apparatus of claim 2, wherein the electric motor is one of a brushless ring motor or an axial flux synchronous permanent magnet motor.

4. The apparatus of claim 1, wherein the electrical drive includes a plurality of electric motors located between the outer surface and the inner surface of the nacelle and arranged circumferentially around the inner surface.

5. The apparatus of claim 1, further comprising a controller to control the supply of electrical energy provided to the electrical drive.

6. The apparatus of claim 1, wherein the supply of electrical energy is generated via an electrical generator of an auxiliary power unit, the electrical generator being operatively coupled to the electrical drive.

7. The apparatus of claim 1, wherein the supply of electrical energy is generated via an electrical generator of a gas turbine, the electrical generator being operatively coupled to the electrical drive.

8. The apparatus of claim 1, wherein the supply of electrical energy is provided via an electrical energy storage device operatively coupled to the electrical drive.

9. The apparatus of claim 8, wherein the electrical energy storage device is one of a battery, a flywheel, or a supercapacitor.

10. The apparatus of claim 1, wherein an outer surface of the augmentor hub ring is substantially aligned with the outer surface of the nacelle.

11. The apparatus of claim 1, wherein the augmentor hub ring is located aft of the ducted fan blades.

12. The apparatus of claim 1, wherein the augmentor hub ring is located forward of the ducted fan blades.

13. The apparatus of claim 1, wherein the augmentor fan further includes a pitch control mechanism to adjust a pitch angle of the augmentor fan blades.

14. The apparatus of claim 1, wherein the augmentor hub ring is located aft of the ducted fan blades and forward of a plurality of duct support struts, the duct support struts extending between the core engine and the nacelle.

15. The apparatus of claim 1, wherein the augmentor fan is configured to rotate in a first direction to generate a first thrust while the ducted fan is rotating in a second direction and generating a second thrust, the first direction being opposite the second direction.

16. The apparatus of claim 1, wherein the electrical drive is an axial flux synchronous permanent magnet motor having an output shaft, the axial flux synchronous permanent magnet motor being operatively coupled to the augmentor hub ring via a first gear coupled to the output shaft and via a second gear coupled to the first gear, the second gear being rigidly coupled to the augmentor hub ring, wherein the axial flux synchronous permanent magnet motor, the first gear, the second gear, and the augmentor hub ring are respectively located between the outer surface and the inner surface of the nacelle.

17. An apparatus comprising:
a turbofan including a core engine and a ducted fan to be rotated via the core engine, the ducted fan including a plurality of ducted fan blades arranged circumferentially around the core engine and circumscribed by a nacelle, the nacelle forming an outermost housing of the turbofan and circumscribing a bypass duct associated with the turbofan, the ducted fan blades being located within the bypass duct;

an augmentor fan configured to increase a bypass ratio associated with rotation of the ducted fan within the bypass duct, the augmentor fan including an augmentor hub ring and a plurality of augmentor fan blades, the augmentor fan blades being arranged circumferentially around the augmentor hub ring and projecting outwardly relative to an outer surface of the nacelle, the augmentor fan to rotate separately from the ducted fan; and means for driving the augmentor hub ring to rotate in response to a supply of electrical energy provided to the means for driving, the means for driving being located radially outward of the bypass duct and between the outer surface and an inner surface of the nacelle.

18. The apparatus of claim 17, further comprising means for generating the supply of electrical energy to be provided to the means for driving, the means for generating being operatively coupled to the means for driving.

19. The apparatus of claim 17, further comprising means for storing the supply of electrical energy to be provided to the means for driving, the means for storing being operatively coupled to the means for driving.

20. A method comprising:
rotating a ducted fan of a turbofan via a core engine of the turbofan, the ducted fan including a plurality of ducted fan blades arranged circumferentially around the core engine and circumscribed by a nacelle, the nacelle forming an outermost housing of the turbofan and circumscribing a bypass duct associated with the turbofan, the ducted fan blades being located within the bypass duct; and rotating an augmentor fan via an electrical drive in response to a supply of electrical energy provided to the electrical drive, the rotating of the augmentor fan increasing a bypass ratio associated with rotation of the ducted fan within the bypass duct, the augmentor fan including an augmentor hub ring and a plurality of augmentor fan blades, the augmentor fan blades being arranged circumferentially around the augmentor hub ring and projecting outwardly relative to an outer surface of the nacelle, the electrical drive being located radially outward of the bypass duct and between the outer surface and an inner surface of the nacelle, the rotating of the augmentor fan being separate from the rotating of the ducted fan.

21. The method of claim 20, further comprising generating the supply of electrical energy via an electrical generator operatively coupled to the electrical drive, the electrical generator being included in one of an auxiliary power unit or a gas turbine.

22. The method of claim 20, further comprising storing the electrical energy to be supplied to the electrical drive, the electrical energy to be stored via an electrical energy storage device operatively coupled to the electrical drive, the electrical energy storage device being one of a battery, a flywheel, or a supercapacitor.

* * * * *